United States Patent
Chen et al.

(10) Patent No.: US 12,395,945 B2
(45) Date of Patent: Aug. 19, 2025

(54) POWER CONTROL FOR SOUNDING REFERENCE SIGNALS

(71) Applicant: QUALCOMM Incorporated, San Diego, CA (US)

(72) Inventors: Yitao Chen, San Diego, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

(21) Appl. No.: 17/681,347

(22) Filed: Feb. 25, 2022

(65) Prior Publication Data

US 2023/0276373 A1    Aug. 31, 2023

(51) Int. Cl.
*H04W 52/32* (2009.01)
*H04L 5/00* (2006.01)
*H04W 24/10* (2009.01)
*H04W 52/24* (2009.01)

(52) U.S. Cl.
CPC ......... *H04W 52/325* (2013.01); *H04L 5/0051* (2013.01); *H04W 24/10* (2013.01); *H04W 52/242* (2013.01)

(58) Field of Classification Search
CPC ............. H04W 52/146; H04W 52/242; H04W 52/325; H04W 52/54; H04W 72/23; H04W 52/08; H04W 52/245; H04W 52/367; H04L 5/0048; H04L 27/261; H04L 27/26
See application file for complete search history.

(56) References Cited

U.S. PATENT DOCUMENTS

| | | | |
|---|---|---|---|
| 2014/0113677 A1* | 4/2014 | Parkvall | H04W 52/146 |
| | | | 455/522 |
| 2022/0116888 A1* | 4/2022 | Si | H04W 56/001 |
| 2022/0132436 A1 | 4/2022 | Hoshino et al. | |
| 2022/0232573 A1* | 7/2022 | Farag | H04W 72/0446 |
| 2022/0346028 A1* | 10/2022 | Cirik | H04W 52/54 |
| 2022/0416958 A1* | 12/2022 | Yan | H04W 72/21 |

FOREIGN PATENT DOCUMENTS

| | | |
|---|---|---|
| EP | 3965346 A1 | 3/2022 |
| WO | WO-2020166624 A1 | 8/2020 |
| WO | WO-2020222621 A1 | 11/2020 |
| WO | WO-2021146161 A1 | 7/2021 |

OTHER PUBLICATIONS

International Search Report and Written Opinion—PCT/US2023/010391—ISA/EPO—May 3, 2023 (2202130WO).

* cited by examiner

*Primary Examiner* — Quoc Thai N Vu
(74) *Attorney, Agent, or Firm* — Holland & Hart / QUALCOMM Incorporated

(57) ABSTRACT

Methods, systems, and devices for wireless communications are described. A user equipment (UE) may receive an indication of path loss compensation values corresponding to the reference signal indices. The UE may measure resources associated with the reference signal indices to generate path loss measurements. The UE may transmit a sounding reference signal using a transmission power based on the path loss measurements and the path loss compensation values.

30 Claims, 13 Drawing Sheets

POWER CONTROL FOR SOUNDING REFERENCE SIGNALS

FIELD OF TECHNOLOGY

The following relates to wireless communications, including power control for sounding reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications system, a wireless device may communicate with multiple transmission/reception points (TRPs) and may transmit a sounding reference signal (SRS). However, methods for such multiple TRP SRS transmission schemes may be deficient.

SUMMARY

The described techniques relate to improved methods, systems, devices, and apparatuses that support power control for sounding reference signals. For example, a user equipment (UE) may receive an indication of path loss compensation values corresponding to the reference signal indices. The UE may measure resources associated with the reference signal indices to generate path loss measurements. The UE may transmit a sounding reference signal using a transmission power based on the path loss measurements and the path loss compensation values.

A method for wireless communications at a user equipment (UE) is described. The method may include receiving an indication of a set of multiple reference signal indices and an indication of a set of multiple path loss compensation values corresponding to the set of multiple reference signal indices, measuring resources associated with the set of multiple reference signal indices to generate a set of multiple path loss measurements, and transmitting a sounding reference signal using a transmission power based on the set of multiple path loss measurements and the set of multiple path loss compensation values.

An apparatus for wireless communications at a UE is described. The apparatus may include a processor, memory coupled with the processor, and instructions stored in the memory. The instructions may be executable by the processor to cause the apparatus to receive an indication of a set of multiple reference signal indices and an indication of a set of multiple path loss compensation values corresponding to the set of multiple reference signal indices, measure resources associated with the set of multiple reference signal indices to generate a set of multiple path loss measurements, and transmit a sounding reference signal using a transmission power based on the set of multiple path loss measurements and the set of multiple path loss compensation values.

Another apparatus for wireless communications at a UE is described. The apparatus may include means for receiving an indication of a set of multiple reference signal indices and an indication of a set of multiple path loss compensation values corresponding to the set of multiple reference signal indices, means for measuring resources associated with the set of multiple reference signal indices to generate a set of multiple path loss measurements, and means for transmitting a sounding reference signal using a transmission power based on the set of multiple path loss measurements and the set of multiple path loss compensation values.

A non-transitory computer-readable medium storing code for wireless communications at a UE is described. The code may include instructions executable by a processor to receive an indication of a set of multiple reference signal indices and an indication of a set of multiple path loss compensation values corresponding to the set of multiple reference signal indices, measure resources associated with the set of multiple reference signal indices to generate a set of multiple path loss measurements, and transmit a sounding reference signal using a transmission power based on the set of multiple path loss measurements and the set of multiple path loss compensation values.

Some examples of the method, apparatuses, and non-transitory computer-readable medium described herein may further include operations, features, means, or instructions for transmitting an indication of UE capability including a quantity of reference signal indices, a quantity of path loss compensation values, or both.

Some examples of the method, apparatuses, and non-transitory computer-readable medium described herein may further include operations, features, means, or instructions for receiving control signaling indicating a function for determining the transmission power to be applied to the set of multiple path loss measurements and the set of multiple path loss compensation values and where the transmission power may be based on the function.

In some examples of the method, apparatuses, and non-transitory computer-readable medium described herein, receiving the indication of the set of multiple reference signal indices and the indication of a set of multiple path loss compensation values may include operations, features, means, or instructions for receiving radio resource control signaling including the indication of the set of multiple reference signal indices and the indication of the set of multiple path loss compensation values.

Some examples of the method, apparatuses, and non-transitory computer-readable medium described herein may further include operations, features, means, or instructions for receiving control signaling indicating a list of reference signal indices corresponding to a sounding reference signal resource set, where the indication of the set of multiple reference signal indices indicates the set of multiple reference signal indices that may be a subset of reference signal indices from the list of reference signal indices.

In some examples of the method, apparatuses, and non-transitory computer-readable medium described herein, the control signaling may be radio resource control signaling and where a medium access control control element includes the indication of the set of multiple reference signal indices.

In some examples of the method, apparatuses, and non-transitory computer-readable medium described herein, the transmission power for the sounding reference signal may be based on a value pair including a path loss compensation value of the set of multiple path loss compensation values and a path loss measurement of the set of multiple path loss measurements.

In some examples of the method, apparatuses, and non-transitory computer-readable medium described herein, the value pair may be selected based on a time index at which the sounding reference signal is to be transmitted.

In some examples of the method, apparatuses, and non-transitory computer-readable medium described herein, the transmission power for the sounding reference signal may be based on a defined smallest valued pair of pairs of the set of multiple path loss measurements and the set of multiple path loss compensation values.

In some examples of the method, apparatuses, and non-transitory computer-readable medium described herein, the defined smallest valued pair may be selected based on a difference between a value of the defined smallest valued pair and a minimum value of the pairs of the set of multiple path loss measurements and the set of multiple path loss compensation values being less than a threshold value.

In some examples of the method, apparatuses, and non-transitory computer-readable medium described herein, the transmission power for the sounding reference signal may be based on a function that determines an average corresponding to the set of multiple path loss measurements and the set of multiple path loss compensation values.

In some examples of the method, apparatuses, and non-transitory computer-readable medium described herein, the transmission power for the sounding reference signal may be based on a function that determines a maximum value corresponding to the set of multiple path loss measurements and the set of multiple path loss compensation values.

In some examples of the method, apparatuses, and non-transitory computer-readable medium described herein, the transmission power for the sounding reference signal may be based on a function that determines a minimum value corresponding to the set of multiple path loss measurements and the set of multiple path loss compensation values.

A method for wireless communications at a network entity is described. The method may include transmitting an indication of a set of multiple reference signal indices and an indication of a set of multiple path loss compensation values corresponding to the set of multiple reference signal indices and receiving a sounding reference signal communicated at a transmission power based on the set of multiple reference signal indices and the set of multiple path loss compensation values.

An apparatus for wireless communications at a network entity is described. The apparatus may include a processor, memory coupled with the processor, and instructions stored in the memory. The instructions may be executable by the processor to cause the apparatus to transmit an indication of a set of multiple reference signal indices and an indication of a set of multiple path loss compensation values corresponding to the set of multiple reference signal indices and receive a sounding reference signal communicated at a transmission power based on the set of multiple reference signal indices and the set of multiple path loss compensation values.

Another apparatus for wireless communications at a network entity is described. The apparatus may include means for transmitting an indication of a set of multiple reference signal indices and an indication of a set of multiple path loss compensation values corresponding to the set of multiple reference signal indices and means for receiving a sounding reference signal communicated at a transmission power based on the set of multiple reference signal indices and the set of multiple path loss compensation values.

A non-transitory computer-readable medium storing code for wireless communications at a network entity is described. The code may include instructions executable by a processor to transmit an indication of a set of multiple reference signal indices and an indication of a set of multiple path loss compensation values corresponding to the set of multiple reference signal indices and receive a sounding reference signal communicated at a transmission power based on the set of multiple reference signal indices and the set of multiple path loss compensation values.

Some examples of the method, apparatuses, and non-transitory computer-readable medium described herein may further include operations, features, means, or instructions for receiving an indication of UE capability including a quantity of reference signal indices, a quantity of path loss compensation values, or both.

Some examples of the method, apparatuses, and non-transitory computer-readable medium described herein may further include operations, features, means, or instructions for transmitting control signaling indicating a function for determining the transmission power to be applied to the set of multiple path loss measurements and the set of multiple path loss compensation values and where the transmission power may be based on the function.

In some examples of the method, apparatuses, and non-transitory computer-readable medium described herein, transmitting the of the set of multiple reference signal indices and the indication of a set of multiple path loss compensation values may include operations, features, means, or instructions for transmitting radio resource control signaling including the indication of the set of multiple reference signal indices and the indication of the set of multiple path loss compensation values.

Some examples of the method, apparatuses, and non-transitory computer-readable medium described herein may further include operations, features, means, or instructions for transmitting control signaling indicating a list of reference signal indices corresponding to a sounding reference signal resource set, where the indication of the set of multiple reference signal indices indicates the set of multiple reference signal indices that may be a subset of reference signal indices from the list of reference signal indices.

In some examples of the method, apparatuses, and non-transitory computer-readable medium described herein, the control signaling may be radio resource control signaling and where a medium access control control element includes the indication of the set of multiple reference signal indices.

In some examples of the method, apparatuses, and non-transitory computer-readable medium described herein, the transmission power may be based on a value pair including a path loss compensation value of the set of multiple path loss compensation values and a path loss measurement of the set of multiple path loss measurements.

In some examples of the method, apparatuses, and non-transitory computer-readable medium described herein, the value pair may be selected based on a time index at which the sounding reference signal is to be transmitted.

In some examples of the method, apparatuses, and non-transitory computer-readable medium described herein, the transmission power may be based on a defined smallest valued pair of pairs of the set of multiple path loss measurements and the set of multiple path loss compensation values.

In some examples of the method, apparatuses, and non-transitory computer-readable medium described herein, the defined smallest valued pair may be selected based on a difference between a value of the defined smallest valued pair and a minimum value of the pairs of the set of multiple path loss measurements and the set of multiple path loss compensation values being less than a threshold value.

In some examples of the method, apparatuses, and non-transitory computer-readable medium described herein, the transmission power may be based on a function that determines an average corresponding to the set of multiple path loss measurements and the set of multiple path loss compensation values.

In some examples of the method, apparatuses, and non-transitory computer-readable medium described herein, the transmission power may be based on a function that determines a maximum value corresponding to the set of multiple path loss measurements and the set of multiple path loss compensation values.

In some examples of the method, apparatuses, and non-transitory computer-readable medium described herein, the transmission power may be based on a function that determines a minimum value corresponding to the set of multiple path loss measurements and the set of multiple path loss compensation values.

DETAILED DESCRIPTION

Figure 1:
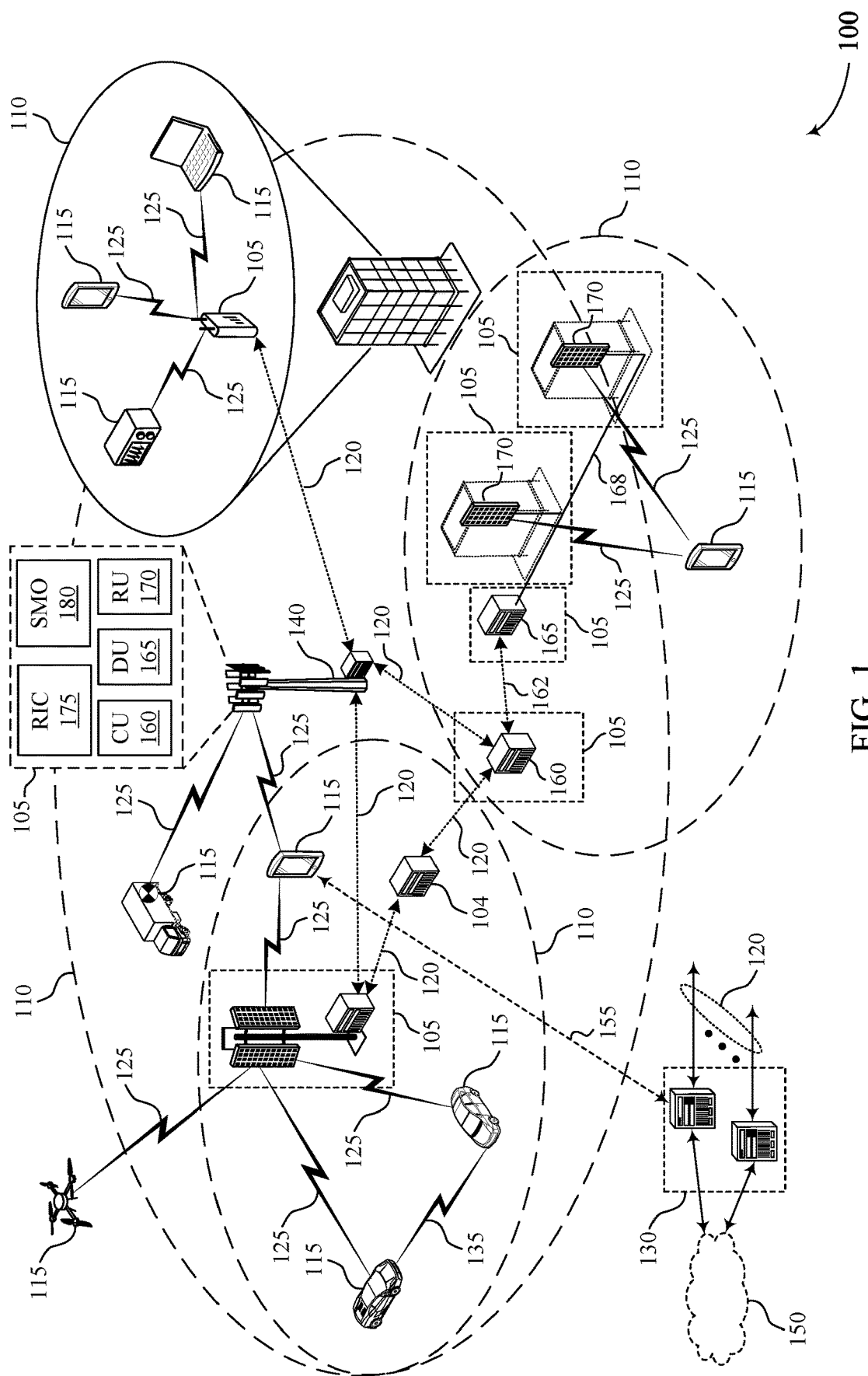
FIG. 1 illustrates an example of a wireless communications system that supports power control for sounding reference signals in accordance with one or more aspects of the present disclosure.

In the course of wireless communications, a user equipment (UE) may interact with multiple transmission/reception points (TRPs), and the UE may transmit a sounding reference signal (SRS) to multiple TRPs to aid in channel estimation. However, the channel conditions associated with each of the TRPs may be different (e.g., due to different distances, obstructions, interference, or other conditions) and would otherwise (e.g., when the UE is communicating with a single TRP) involve the use of differing power control parameters for transmitting the SRS. However, when the UE is transmitting a single SRS for multiple TRPs, it is not clear how the power control parameters are to be configured. For example, it may not be clear which path loss reference signal (PL-RS) is to be used for power control and adjusting SRS power control parameters based on a first PL-RS for a first TRP may result in a second TRP not receiving the SRS (e.g., due to lack of signal strength or increased interference). Additionally, or alternatively, it may not be clear how a network entity may configure one or more power control parameters (e.g., path loss compensation parameters) given the differences in channel conditions associated with the various TRPs.

To allow for power control configuration (e.g., in multiple TRP scenarios or coherent joint transmission scenarios), a UE may receive multiple PL-RS indices and corresponding multiple power control parameters (e.g., path loss compensation parameters) to calculate a transmission power for an SRS. Based on UE measurements, the UE may determine a path loss value or measurement corresponding to the multiple PL-RS indices. The UE may determine the transmit power based on the path loss measurement values and the indicated power control parameters (e.g., PL*alpha for each PL-RS). For example, the UE may average the various values, take a minimum value, or take a maximum value. Additionally, or alternatively, the UE may engage in a pseudo-random power hopping scheme based on time indices for the SRS transmission or select an Xth smallest value, optionally dictated by a threshold between the smallest value and the Xth smallest value. In this way, power control parameters for SRS transmission may be determined in a way that allows for reception of the SRS at the multiple TRPs.

Particular aspects of the subject matter described in this disclosure may be implemented to realize one or more of the following potential advantages. The techniques employed by the described communication devices may provide benefits and enhancements to the operation of the communication devices, including increased communication quality (e.g., of SRS transmissions) with multiple TRPs and reduced interference with other communications (e.g., other UEs making other SRS transmissions. For example, operations performed by the described communication devices may provide improvements to SRS transmission procedures by adjusting an SRS transmission power based on multiple path loss measurements associated with multiple TRPs and corresponding path loss compensation values. In some implementations, the operations performed by the described communication devices to improve communication quality and reduce interference include signaling of multiple reference signal indices and corresponding path loss compensation values and measurement of resources associated with the reference signal indices to produce path loss measurements, some or all of which may be used for adjusting, selecting, or calculating an SRS transmission power (e.g., taking conditions associated with multiple TRPs into account), thereby promoting or ensuring adequate signal strength at one or more TRPs while at the same time reducing or eliminating interference (e.g., with other SRS transmissions) that one or more TRPs may also be receiving. In some other implementations, operations performed by the described communication devices may also support improvements to power consumption, processing overhead, transmission overhead, transmission reliability of SRSs or other transmissions, spectral efficiency, higher data rates, and, in some examples, low latency for uplink communications, among other benefits.

Aspects of the disclosure are initially described in the context of wireless communications systems. Aspects of the disclosure are then described in the context of a system and a process flow. Aspects of the disclosure are further illustrated by and described with reference to apparatus diagrams, system diagrams, and flowcharts that relate to power control for sounding reference signals.

FIG. 1 illustrates an example of a wireless communications system 100 that supports power control for sounding reference signals in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with TAB node 104 may be scheduled by DU 165 of TAB node 104.

In the case of the techniques described herein applied in the context of a disaggregated RAN architecture, one or more components of the disaggregated RAN architecture may be configured to support power control for sounding reference signals as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some examples, a UE 115 may communicate with multiple TRPs (which may be examples of RUs 170). A network entity 105 may communicate with the UE 115 and may transmit multiple PL-RS indices and corresponding multiple power control parameters (e.g., alpha values) that the UE 115 may use to calculate power for transmission (e.g., transmission of an SRS). The UE 115 may obtain one or more measurements (e.g., path loss measurements) corresponding to the multiple PL-RS indices. The UE 115 may then determine a transmit power for a transmission (e.g., a single SRS transmission) to be received at the multiple TRPs. The UE 115 may determine this transmit power as a function of the one or more measurements, the received power control parameters (e.g., alpha values or path loss compensation values), or both, to promote adequate reception of the signal (e.g., the SRS) at the multiple TRPs. In this way, a transmission power (e.g., for an SRS transmission) may be determined or selected to provide adequate transmission power to reach all of the multiple TRPs without overpowering and causing interference for other communications.

Figure 2:
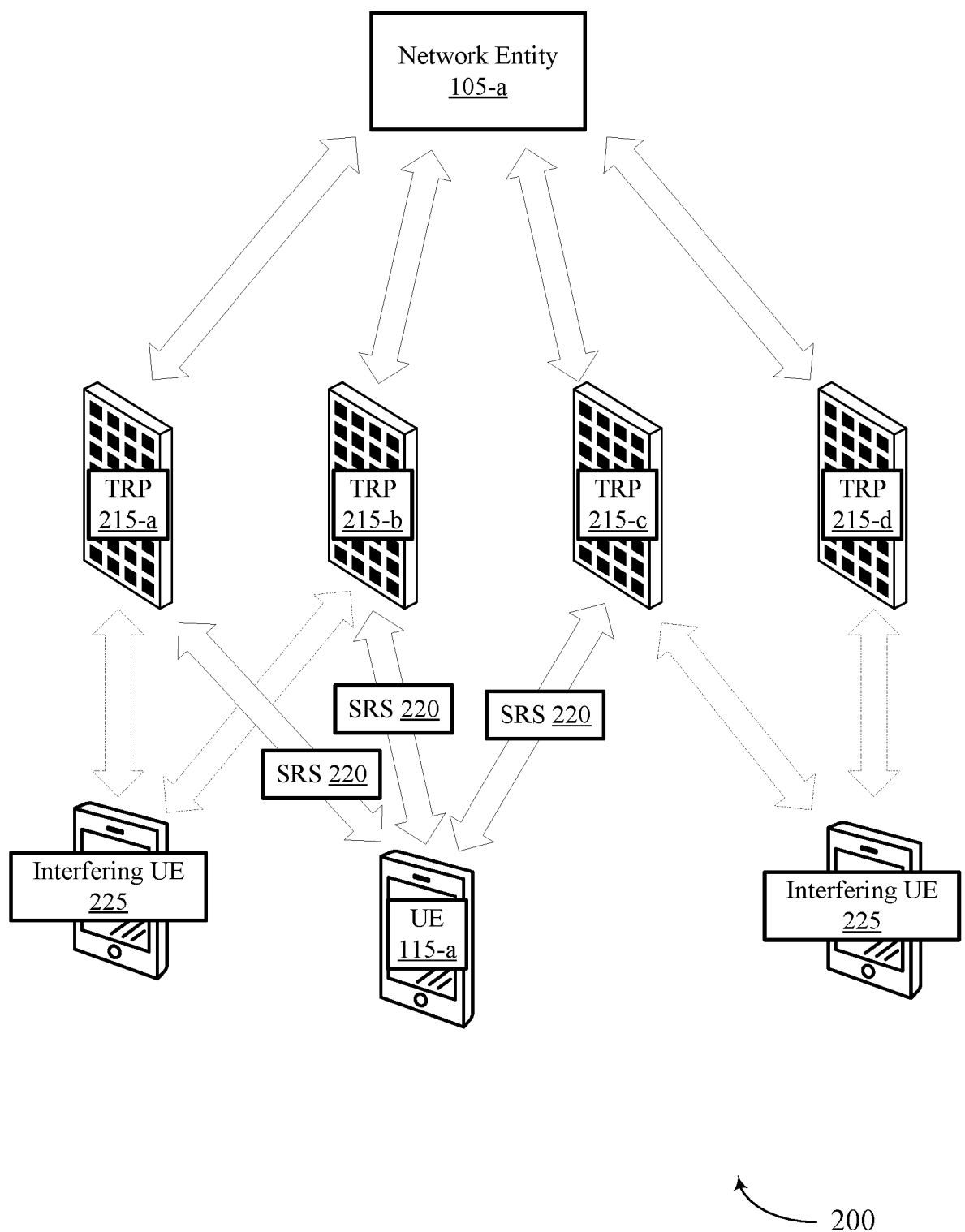
FIG. 2 illustrates an example of a system that supports power control for sounding reference signals in accordance with one or more aspects of the present disclosure.

FIG. 2 illustrates an example of a system 200 that supports power control for sounding reference signals in accordance with one or more aspects of the present disclosure. The system 200 may include a network entity 105-a, a UE 115-a, and multiple TRPs 215. Further, interfering UEs 225 may also be present or may form part of the system 200. The network entity 105-a may communicate with the UE 115-a via one or more of the TRPs 215, and may do so via uplink communication links, downlink communication links, or both. In some examples, the UE 115-a may transmit an SRS 220 to one or more of the TRPs 215 and information associated with the SRS 220 may be transmitted to the network entity 105-a.

In the course of wireless communications, a UE 115-a may transmit (e.g., an SRS) using a power level and the power level may be determined or selected using one or more power control parameters. Such parameters may include parameters for open loop power control. For example, open loop power control may include or be associated with a $P_0$ parameter or measurement (e.g., a power offset parameter), a PL parameter or measurement that may represent a path loss (e.g., measured by the UE), and an a (or alpha) parameter that may be a path loss compensation or scaling parameter. In some examples, an alpha parameter of a value less than 1 may correspond to partial path loss compensation and a value of 1 may correspond to full path loss compensation. The alpha parameter may be determined or selected based on a path loss measurement (e.g., of an SSB or a CSI-RS). In some examples, an index of a reference signal may be configured (e.g., through control signaling, such as RRC). Additionally, or alternatively, a list of reference signal indices (e.g., SSB indices, CSI-RS indices, other indices, or any combination thereof) may be configured (e.g., through control signaling, such as RRC) and one or more indices of the list may be selected or activated through additional control signaling (e.g., MAC-CE signaling).

In some examples, a UE may engage in coherence joint transmission (CJT) across multiple TRPs. In some such examples, the UE may transmit an SRS 220 as part of a TDD scheme, which may be used to acquire a channel for CJT, precoding, or both. The UE may transmit such an SRS 220 to multiple TRPs, some or all of which may use the SRS for additional operations. In some examples (e.g., operation in FR1), a UE may transmit an SRS 220 over a single SRS resource and the SRS 220 may be received by multiple TRPs.

A UE making such a transmission may engage in power control operations. In some approaches, it may not be clear which PL-RS received by the UE should be used as a basis for power control operations (e.g., adjusting a transmission power). For example, if a PL-RS corresponding to TRP 215-$a$ is used, the SRS may not be received by TRP 215-$c$ (e.g., due to interference from an interfering UE 225). If a PL-RS corresponding to TRP 215-$c$ (e.g., that involves a greater path loss) interference in the system may be increased. For example, a transmission from an interfering UE 225 may not be received at TRP 215-$a$ due to interference from the UE 115-$a$.

Further, in some approaches, different TRPs 215 may use different power control parameters (e.g., alpha parameters or other path loss compensation parameters) for legacy UEs. For example, an alpha value of 0.7 may be used for legacy UEs associated with TRP 215-$a$ and an alpha value of 1 for legacy UEs associated with TRP 215-$c$. In such cases, when considering the UE 115-$a$, configuring of one alpha value by the network may not be enough if multiple PL-RSs.

As such, to reduce or eliminate issues present in other approaches, the UE 115-$a$ may receive multiple PL-RS indices corresponding to the TRPs 215 and corresponding power control parameters (e.g., alpha values or other path loss compensation parameters, such as $\alpha_1, \alpha_2, \ldots \alpha_N$) to be used for calculating a transmission power for transmission of the SRS 220. The PL-RS indices may indicate which references signals the UE 115-$a$ is to measure. For example, each of the PL-RS indices may correspond to a reference signal transmission by one of the TRPs 215 in a particular time-frequency resource. The UE may make measurements of reference signals associated with the PL-RS indices and may further determine or select path loss values (e.g., PL parameters or values) corresponding to the PL-RS indices (e.g., notated as $PL_1, PL_2, \ldots, PL_N$). The UE may calculate a transmit power for the SRS 220, and may do so as a function (e.g., a relationship, an association, or a formula) of measured path loss values and path loss compensation values. In some examples, the transmission power may be expressed in an equation, such as Equation 1, and the UE may determine a transmit power for the SRS 220 based on a function (e.g., expressed generally as f(•) in Equation 1). Such a function may be a defined or predefined function available to the UE or may be dynamically indicated to or configured for the UE (e.g., through control signaling from the network entity 105-$a$). In Equation 1, P may represent a transmit power (e.g., calculated based one or more of the other parameters), $P_0$ may represent an initial power control parameter (e.g., a starting point for a power control calculation, that may be provided as part of a power control configuration), M may represent a number of resource blocks used for SRS transmission, and h may represent one or more closed loop power control parameters.

$$P = P_0 + 10 \log_{10} M + f(\alpha_1 *PL_1, \alpha_2 *PL_2, \ldots, \alpha_N *PL_N) + h \quad (1)$$

In some examples, a function that the UE 115-$a$ uses to determine a transmit power for the SRS 220 may include an averaging function. Such an approach may reflect an average situation across multiple TRPs. For example, the UE 115-$a$ may average among N values of $\alpha_i *PL_i$, as may be expressed by Equation 2.

$$f(\alpha_1 *PL_1, \alpha_2 *PL_2, \ldots, \alpha_N *PL_N) = \frac{1}{N}(\alpha_1 *PL_1, \alpha_2 *PL_2, \ldots, \alpha_N *PL_N) \quad (2)$$

In some examples, a function that the UE uses to determine a transmit power for the SRS 220 may take a maximum value among the N values of $\alpha_i *PL_i$, as may be expressed by Equation 3. Such an approach may promote or ensure that the furthest TRP 215 from the UE can receive the SRS 220 with a desired received power. Such an approach may be described as accommodating a "worst case" scenario.

$$f(\alpha_1 *PL_1, \alpha_2 *PL_2, \ldots, \alpha_N *PL_N) = \max(\alpha_1 *PL_1, \alpha_2 *PL_2, \ldots, \alpha_N *PL_N) \quad (3)$$

In some examples, a function that the UE uses to determine a transmit power for the SRS 220 may take a minimum value among the N values of $\alpha_i *PL_i$, as may be expressed by Equation 4. Such an approach may reduce or minimize the interference to TRPs 215 (e.g., TRPs 215 other than an intended TRP 215) and may promote or ensure that a transmit power for the SRS 220 is not too large while, at the same time, at least one TRP 215 can receive the SRS 220 with a desired received power.

$$f(\alpha_1 *PL_1, \alpha 2*PL_2, \ldots, \alpha_N *PL_N) = \min(\alpha_1 *PL_1, \alpha_2 *PL_2, \ldots, \alpha_N *PL_N) \quad (4)$$

In some examples, the UE 115-$a$ may engage in a power hopping approach. For example, the UE 115-$a$ may select one $\alpha_i \cdot PL_i$ pair out of N such pairs depending on one or more factors (e.g., slot number, symbol number, another factor, or any combination thereof) in a pseudo random manner. In some examples, the selection (or pseudo random function) depends on a time index (e.g., slot number, symbol number, or both, another time index, or any combination thereof) associated with the transmission of the SRS 220 or other transmission. For example, the UE may use different $\alpha_i \cdot PL_i$ values among the N values at different instances of SRS 220 transmission (e.g., by hopping across them in power domain). In some examples, the UE 115-$a$ may randomize or pseudo-randomize the power level and therefore an amount of interference created for other TRPs 215, while, at each "hop" at least one TRP can receive the SRS 220 with a desired received power.

In some examples, the UE 115-$a$ may select a defined smallest value pair for determining or selecting a transmission power for the SRS 220. For example, the UE 115-$a$ may select, among the N values of $\alpha_i \cdot PL_i$, the Xth smallest value. In some examples, the value of X may be configured via control signaling (e.g., RRC, DCI, MAC-CE, other control signaling, or any combination thereof) or may be fixed or predefined and made available to the UE 115-$a$. Such an approach may promote or ensure that X number or quantity of TRPs 215 can receive the SRS 220 with at least a desired power, if not a greater than received power. For example, if X=1, then such an approach may be similar to a minimum value approach. If X=N, such an approach may be similar to a maximum value approach described above.

In some examples, the X value may be the largest value such that the difference between the smallest $\alpha_i \cdot PL_i$ and the Xth smallest $\alpha_i \cdot PL_i$ is equal to, less than, or greater than a threshold value. In some examples, such a threshold value may be received via control signaling (e.g., RRC, DCI, MAC-CE, other control signaling, or any combination thereof) or may be fixed or predefined and made available to the UE 115-*a*. where the threshold can be RRC configured. For example, if there is a single dominant TRP 215, the UE 115-*a* may not adjust parameters to reach any other TRPs 215. Therefore, in such a case, the X value may be 1 since the smallest $\alpha_i \cdot PL_i$ may be much smaller than the next value. In another example, if there are 3 dominant TRPs 215, the UE 115-*a*, the network entity 105-*a*, or both, may adjust parameters to reach those TRPs. Therefore, in such a case, the X value may be 3 as the first three smallest $\alpha_i \cdot PL_i$ values may be close to each other, but another value may be farther away.

As discussed herein, the UE may receive an indication of the reference signal (e.g., PL-RS) indices and corresponding path loss compensation values (e.g., alpha values). In some examples, the reference signal indices and path loss compensation values may be received or configured via control signaling (e.g., RRC signaling). In some examples, the reference signal indices and path loss compensation values may be configured per SRS 220 resource set and may be applied to all SRS resources within the set.

Additionally, or alternatively, a list of reference signal indices, path loss compensation values, or both, may be received or configured via control signaling (e.g., RRC signaling). For example, such operations may be examples of operations described with reference to FIG. 3, such as at step 325, step 330, or both. In some examples, the reference signal indices and path loss compensation values may be configured per SRS 220 resource set. Further, additional control signaling (e.g., MAC-CE control signaling) may indicate one or more indices (e.g., N number or quantity of indices) from the list to be used (e.g., indicate a subset of reference signal indices and path loss compensation values used from the list for determining SRS transmission power). In some examples, control signaling (e.g., MAC-CE) may indicate an SRS resource set identifier to which the indication or selection of reference signal indices and path loss compensation values from the list may be applied. In some examples, an indication of multiple path loss compensation values (e.g., alpha values) may be based on an association of one or more reference signal indices and one or more path loss compensation values (e.g., which may be indicated through the list in RRC or other control signaling). In other words, an explicit indication of multiple alpha values in the control signaling (e.g., the MAC-CE signaling that selects from the list of reference signal indices and path loss compensation values) may not be needed.

In some examples, the UE 115-*a* may indicate (e.g., to the network entity 105-*a* or other entity) an indication of the capability of the UE 115-*a* to calculate or select a transmission power level (e.g., for an SRS 220). Such operations may be examples of operations described with reference to FIG. 3, such as at step 320. For example, the UE 115-*a* may transmit or indicate a maximum number of reference signal indices, path loss compensation values, or both that the UE 115-*a* may support (e.g., for power control of one or more SRS resource sets). In some examples, such a capability may be different than a quantity of reference signals that the UE 115-*a* can track (e.g., across all SRS resource sets, or for different UL transmissions). Rather, this capability may be a maximum number of indices that the UE 115-*a* may use in a power control formula (examples of which are provided herein) for determining an SRS transmission power.

Though examples herein describe power control procedures and signaling for transmission of an SRS 220, the subject matter herein also contemplates application of such approaches to other transmissions. For example, the subject matter described herein may also be used for PUSCH power control and PUCCH power control. In examples of PUSCH power control, one or more SRI codepoints (e.g., indicated in DCI) that may schedule a PUSCH transmission, each UL TCI state, other parameters that may determine or influence a set of power control parameters for PUSCH transmissions, or any combination thereof, may be associated with the multiple reference signal indices and the multiple alpha values for determining a PUSCH transmission power level, a PUCCH power level, or the like. In examples of PUCCH power control, indications (e.g., of reference signal indices) may be received or associated per PUCCH resource (e.g., by RRC or MAC CE). Similar to the discussion above, a UE may generate path loss measurements of reference signals corresponding to the reference signal indices and apply those measurements and corresponding alpha values to a function as described herein for determining a transmission power level for a PUSCH transmission, a PUCCH transmission, or other uplink transmission. In some instances, alpha values may not be used in determining a PUCCH transmission power level. As such, a UE may generate path loss measurements of reference signals corresponding to the reference signal indices for determining PUCCH transmission power level.

Figure 3:
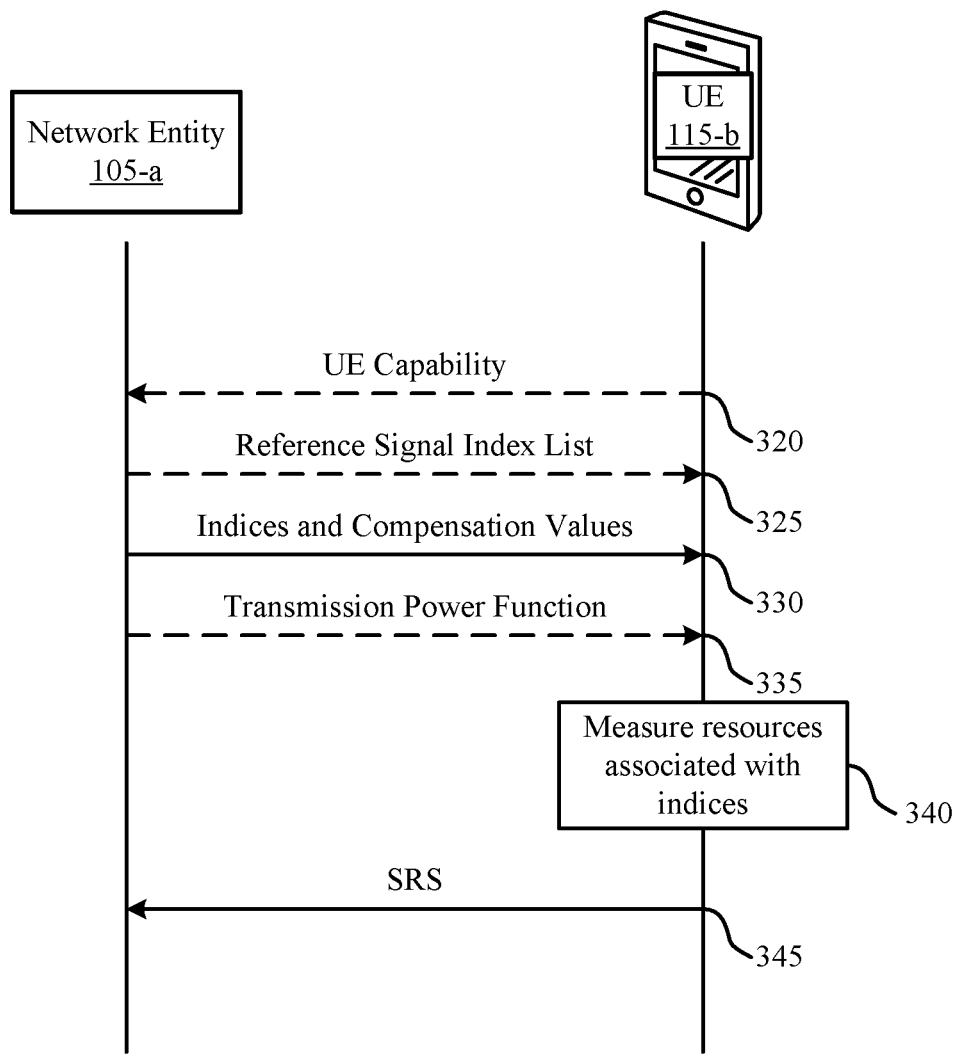
FIG. 3 illustrates an example of a process flow that supports power control for sounding reference signals in accordance with one or more aspects of the present disclosure.

FIG. 3 illustrates an example of a process flow 300 that supports power control for sounding reference signals in accordance with one or more aspects of the present disclosure. The process flow 300 may implement various aspects of the present disclosure described with reference to FIGS. 1-2. The process flow 300 may include the UE 115-*b* and the network entity 105-*b*, which may be examples of similarly named elements as described with reference to FIGS. 1-2.

In the following description of the process flow 300, the operations between the UE 115-*b* and network entity 105-*b* may be performed in different orders or at different times. Some operations may also be left out of the process flow 300, or other operations may be added. Although the UE 115-*b* and network entity 105-*b* are shown performing the operations of the process flow 300, some aspects of some operations may also be performed by other elements of the process flow 300 or by elements that are not depicted in the process flow, or any combination thereof.

At 320, the UE 115-*b* may transmit, to network entity 105-*a*, an indication of UE capability that may include a quantity of reference signal indices, a quantity of path loss compensation values, or both.

At 325, the UE 115-*b* may receive, from network entity 105-*a*, control signaling indicating a list of reference signal indices corresponding to a sounding reference signal resource set. In some examples, the control signaling may be radio resource control signaling.

At 330, the UE 115-*b* may receive, from network entity 105-*a*, an indication of a plurality of reference signal indices and an indication of a plurality of path loss compensation values corresponding to the plurality of reference signal indices. In some examples, the UE 115-*b* may receive radio resource control signaling that may include the indication of the plurality of reference signal indices and the indication of the plurality of path loss compensation values. In some examples, the indication of the plurality of reference signal indices may indicate the plurality of reference signal indices that are a subset of reference signal indices from the list of reference signal indices. In some examples, a medium access control control element may include the indication of the plurality of reference signal indices. In some examples, the indication of the plurality of reference signal indices, the indication of the plurality of path loss compensation values, or both, may be transmitted, selected, or determined based on the UE capability. For example, if the UE indicates a quantity of reference signal indices and a quantity of path loss compensation values, the plurality of reference signal indices and the plurality of path loss compensation values may each be less than or equal to the quantities indicated by the UE in the UE capability.

At 335, the UE 115-*b* may receive control signaling, from network entity 105-*a*, that may indicate a function for determining the transmission power to be applied to the plurality of path loss measurements and the plurality of path loss compensation values.

At 340, the UE 115-*b* may measure resources associated with the plurality of reference signal indices to generate a plurality of path loss measurements.

At 345, the UE 115-*b* may transmit, to network entity 105-*a*, a sounding reference signal using a transmission power based on the plurality of path loss measurements and the plurality of path loss compensation values. In some examples, the transmission power may be based on the function. In some examples, the transmission power for the sounding reference signal may be based on a value pair that may include a path loss compensation value of the plurality of path loss compensation values and a path loss measurement of the plurality of path loss measurements. In some examples, the value pair may be selected based on a time index at which the sounding reference signal is to be transmitted. In some examples, the transmission power for the sound reference signal may be based on a defined smallest valued pair of pairs of the plurality of path loss measurements and the plurality of path loss compensation values. In some examples, the defined smallest valued pair may be selected based on a difference between a value of the defined smallest valued pair and a minimum value of the pairs of the plurality of path loss measurements and the plurality of path loss compensation values being less than a threshold value.

In some examples, the transmission power for the sounding reference signal may be based on a function that determines an average corresponding to the plurality of path loss measurements and the plurality of path loss compensation values. In some examples, the transmission power for the sounding reference signal may be based on a function that determines a maximum value corresponding to the plurality of path loss measurements and the plurality of path loss compensation values. In some examples, the transmission power for the sounding reference signal may be based on a function that determines a minimum value corresponding to the plurality of path loss measurements and the plurality of path loss compensation values.

Figure 4:
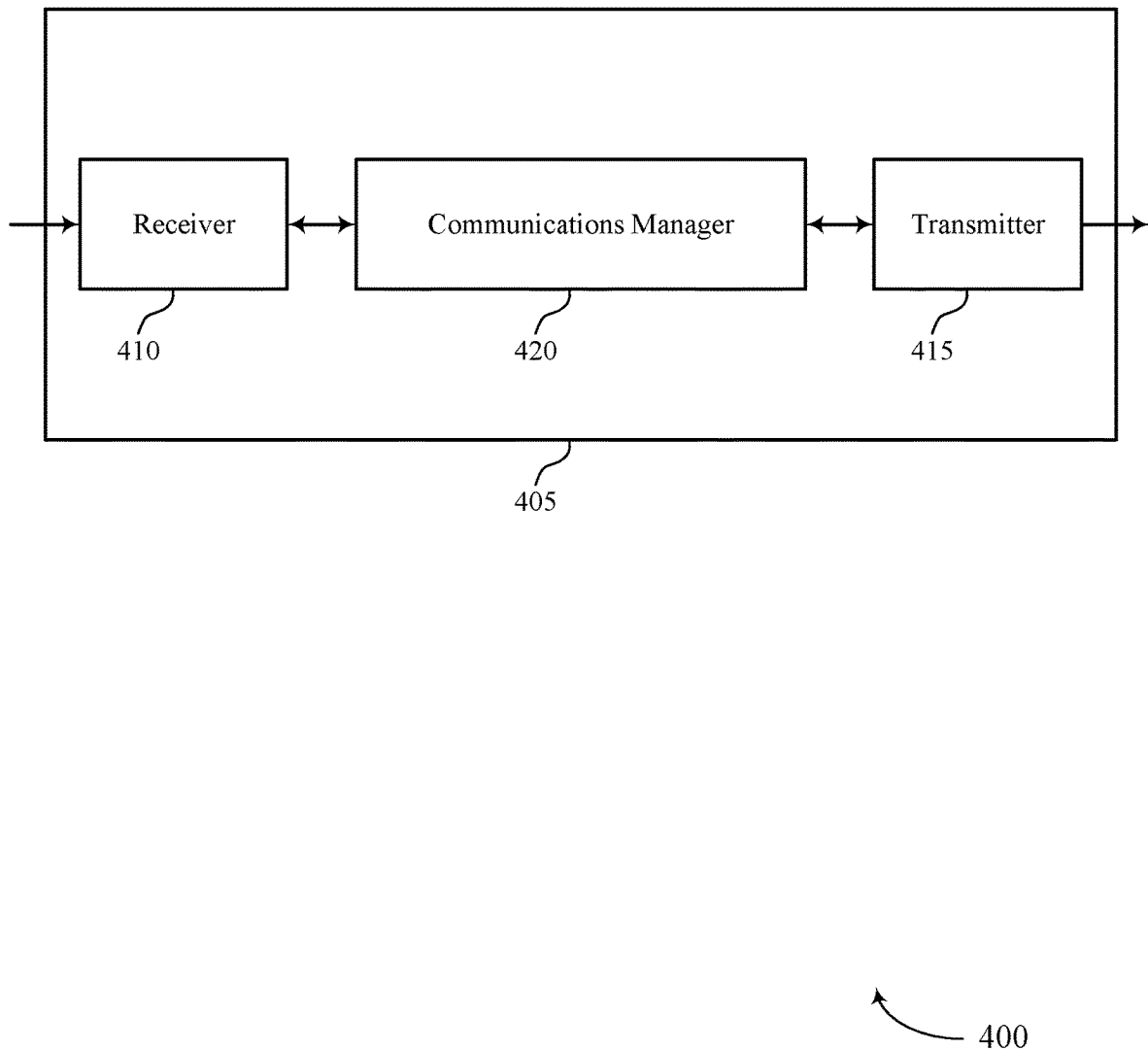
FIGS. 4 and 5 show block diagrams of devices that support power control for sounding reference signals in accordance with one or more aspects of the present disclosure.

FIG. 4 shows a block diagram 400 of a device 405 that supports power control for sounding reference signals in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to power control for sounding reference signals). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to power control for sounding reference signals). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of power control for sounding reference signals as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

Additionally, or alternatively, the communications manager 420 may support wireless communications at a UE in accordance with examples as disclosed herein. For example, the communications manager 420 may be configured as or otherwise support a means for receiving an indication of a set of multiple reference signal indices and an indication of a set of multiple path loss compensation values corresponding to the set of multiple reference signal indices. The communications manager 420 may be configured as or otherwise support a means for measuring resources associated with the set of multiple reference signal indices to generate a set of multiple path loss measurements. The communications manager 420 may be configured as or otherwise support a means for transmitting a sounding reference signal using a transmission power based on the set of multiple path loss measurements and the set of multiple path loss compensation values.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing, reduced power consumption, more efficient utilization of communication resources, or a combination thereof.

Figure 5:
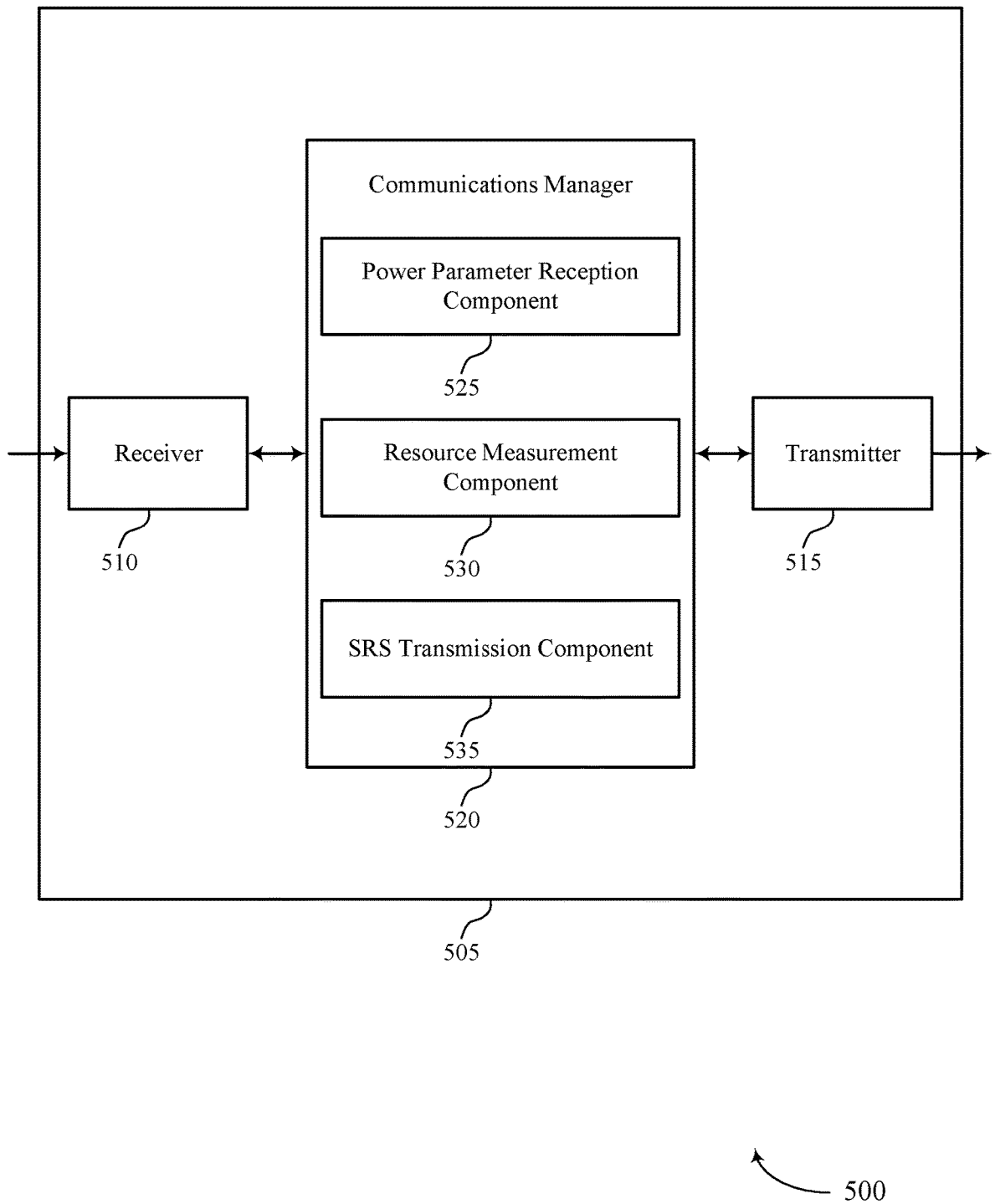

FIG. 5 shows a block diagram 500 of a device 505 that supports power control for sounding reference signals in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to power control for sounding reference signals). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power control for sounding reference signals). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of power control for sounding reference signals as described herein. For example, the communications manager 520 may include a power parameter reception component 525, a resource measurement component 530, an SRS transmission component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. The power parameter reception component 525 may be configured as or otherwise support a means for receiving an indication of a set of multiple reference signal indices and an indication of a set of multiple path loss compensation values corresponding to the set of multiple reference signal indices. The resource measurement component 530 may be configured as or otherwise support a means for measuring resources associated with the set of multiple reference signal indices to generate a set of multiple path loss measurements. The SRS transmission component 535 may be configured as or otherwise support a means for transmitting a sounding reference signal using a transmission power based on the set of multiple path loss measurements and the set of multiple path loss compensation values.

Figure 6:
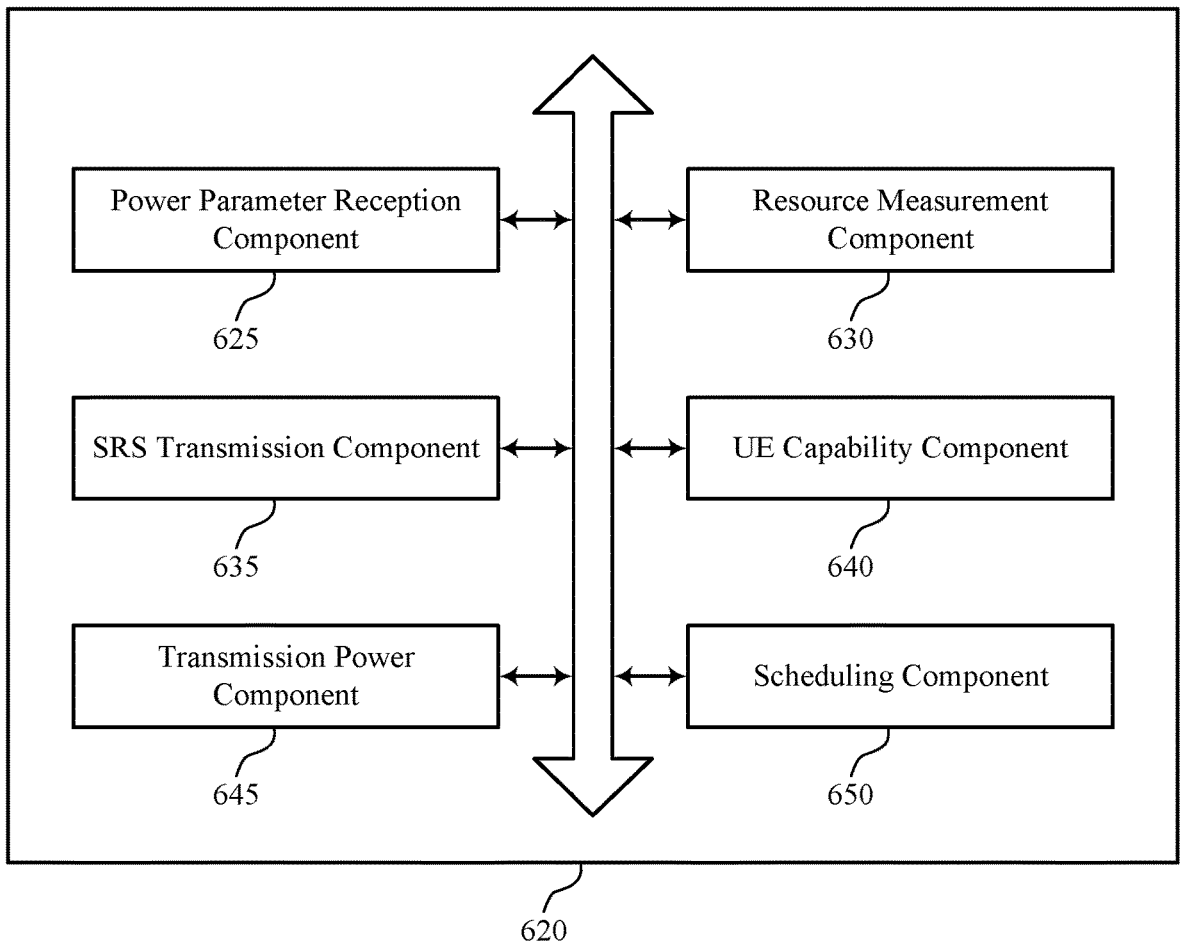
FIG. 6 shows a block diagram of a communications manager that supports power control for sounding reference signals in accordance with one or more aspects of the present disclosure.

FIG. 6 shows a block diagram 600 of a communications manager 620 that supports power control for sounding reference signals in accordance with one or more aspects of the present disclosure. The communications manager 620 may be an example of aspects of a communications manager 420, a communications manager 520, or both, as described herein. The communications manager 620, or various components thereof, may be an example of means for performing various aspects of power control for sounding reference signals as described herein. For example, the communications manager 620 may include a power parameter reception component 625, a resource measurement component 630, an SRS transmission component 635, a UE capability component 640, a transmission power component 645, a scheduling component 650, or any combination thereof. Each of these components may communicate, directly or indirectly, with one another (e.g., via one or more buses).

Additionally, or alternatively, the communications manager 620 may support wireless communications at a UE in accordance with examples as disclosed herein. The power parameter reception component 625 may be configured as or otherwise support a means for receiving an indication of a set of multiple reference signal indices and an indication of a set of multiple path loss compensation values corresponding to the set of multiple reference signal indices. The resource measurement component 630 may be configured as or otherwise support a means for measuring resources associated with the set of multiple reference signal indices to generate a set of multiple path loss measurements. The SRS transmission component 635 may be configured as or otherwise support a means for transmitting a sounding reference signal using a transmission power based on the set of multiple path loss measurements and the set of multiple path loss compensation values.

In some examples, the UE capability component 640 may be configured as or otherwise support a means for transmitting an indication of UE capability including a quantity of reference signal indices, a quantity of path loss compensation values, or both.

In some examples, the power parameter reception component 625 may be configured as or otherwise support a means for receiving control signaling indicating a function for determining the transmission power to be applied to the set of multiple path loss measurements and the set of multiple path loss compensation values. In some examples, the transmission power component 645 may be configured as or otherwise support a means for where the transmission power is based on the function.

In some examples, to support receiving the indication of the set of multiple reference signal indices and the indication of a set of multiple path loss compensation values, the power parameter reception component 625 may be configured as or otherwise support a means for receiving radio resource control signaling including the indication of the set of multiple reference signal indices and the indication of the set of multiple path loss compensation values.

In some examples, the power parameter reception component 625 may be configured as or otherwise support a means for receiving control signaling indicating a list of reference signal indices corresponding to a sounding reference signal resource set, where the indication of the set of multiple reference signal indices indicates the set of multiple reference signal indices that are a subset of reference signal indices from the list of reference signal indices.

In some examples, the control signaling is radio resource control signaling. In some examples, where a medium access control control element includes the indication of the set of multiple reference signal indices.

In some examples, the transmission power for the sounding reference signal is based on a value pair including a path loss compensation value of the set of multiple path loss compensation values and a path loss measurement of the set of multiple path loss measurements.

In some examples, the value pair is selected based on a time index at which the sounding reference signal is to be transmitted.

In some examples, the transmission power for the sounding reference signal is based on a defined smallest valued pair of pairs of the set of multiple path loss measurements and the set of multiple path loss compensation values.

In some examples, the defined smallest valued pair is selected based on a difference between a value of the defined smallest valued pair and a minimum value of the pairs of the set of multiple path loss measurements and the set of multiple path loss compensation values being less than a threshold value.

In some examples, the transmission power for the sounding reference signal is based on a function that determines an average corresponding to the set of multiple path loss measurements and the set of multiple path loss compensation values.

In some examples, the transmission power for the sounding reference signal is based on a function that determines a maximum value corresponding to the set of multiple path loss measurements and the set of multiple path loss compensation values.

In some examples, the transmission power for the sounding reference signal is based on a function that determines a minimum value corresponding to the set of multiple path loss measurements and the set of multiple path loss compensation values.

Figure 7:
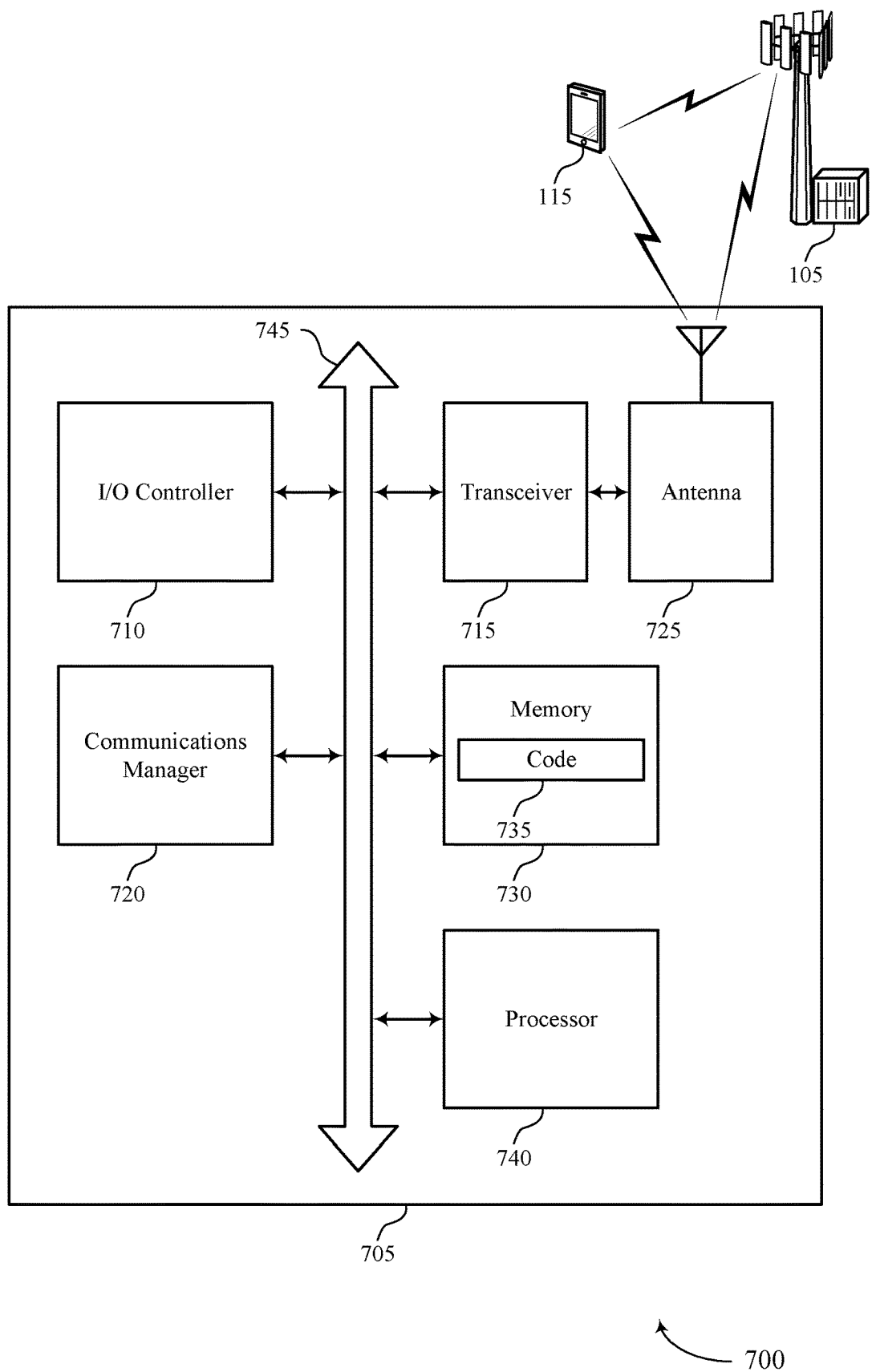
FIG. 7 shows a diagram of a system including a device that supports power control for sounding reference signals in accordance with one or more aspects of the present disclosure.

FIG. 7 shows a diagram of a system 700 including a device 705 that supports power control for sounding reference signals in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting power control for sounding reference signals). For example, the device 705 or a component of the device 705 may include a processor 740 and memory 730 coupled with or to the processor 740, the processor 740 and memory 730 configured to perform various functions described herein.

Additionally, or alternatively, the communications manager 720 may support wireless communications at a UE in accordance with examples as disclosed herein. For example, the communications manager 720 may be configured as or otherwise support a means for receiving an indication of a set of multiple reference signal indices and an indication of a set of multiple path loss compensation values corresponding to the set of multiple reference signal indices. The communications manager 720 may be configured as or otherwise support a means for measuring resources associated with the set of multiple reference signal indices to generate a set of multiple path loss measurements. The communications manager 720 may be configured as or otherwise support a means for transmitting a sounding reference signal using a transmission power based on the set of multiple path loss measurements and the set of multiple path loss compensation values.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of power control for sounding reference signals as described herein, or the processor 740 and the memory 730 may be otherwise configured to perform or support such operations.

Figure 8:
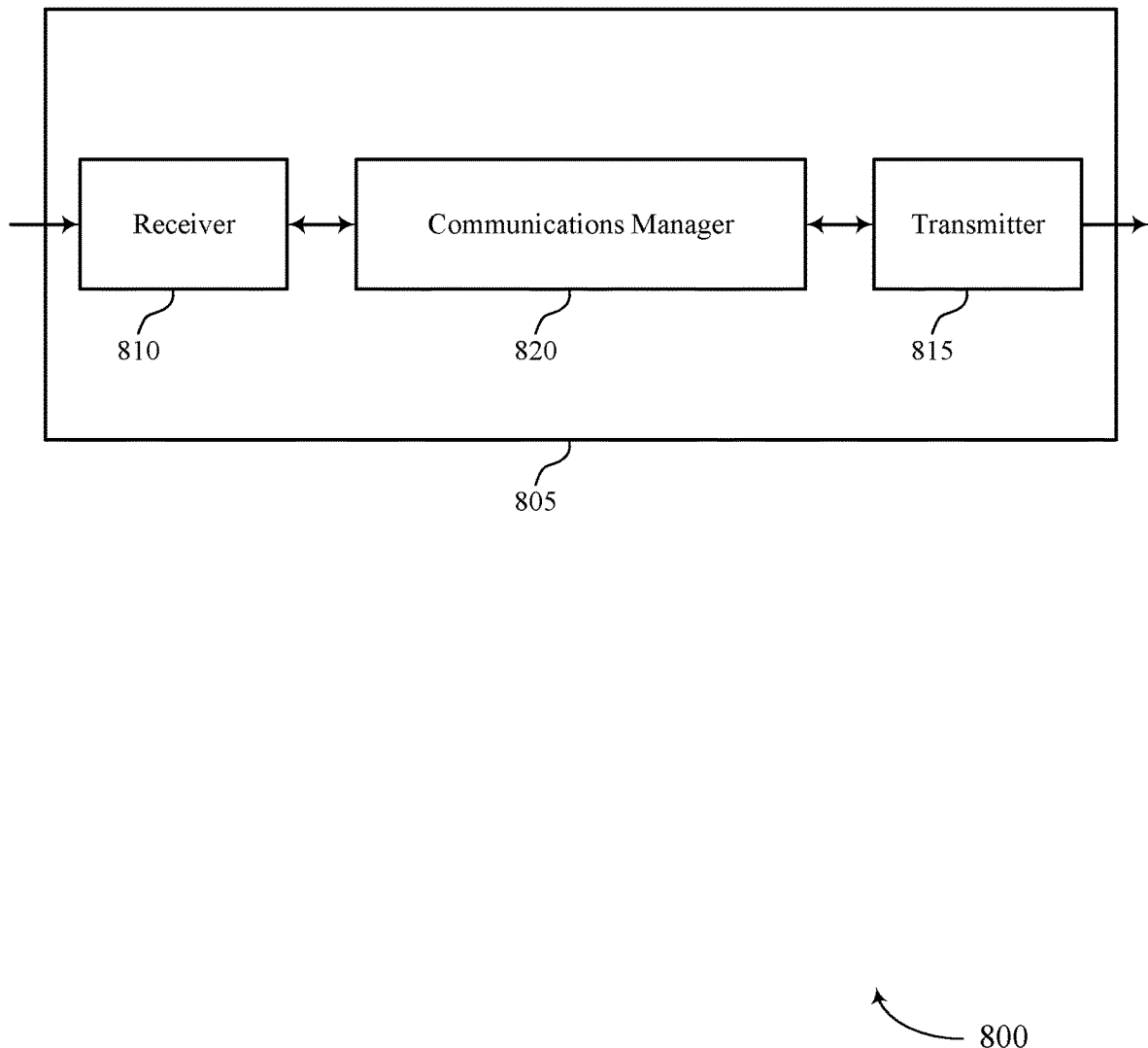
FIGS. 8 and 9 show block diagrams of devices that support power control for sounding reference signals in accordance with one or more aspects of the present disclosure.

FIG. 8 shows a block diagram 800 of a device 805 that supports power control for sounding reference signals in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of power control for sounding reference signals as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

Additionally, or alternatively, the communications manager 820 may support wireless communications at a network entity in accordance with examples as disclosed herein. For example, the communications manager 820 may be configured as or otherwise support a means for transmitting an indication of a set of multiple reference signal indices and an indication of a set of multiple path loss compensation values corresponding to the set of multiple reference signal indices. The communications manager 820 may be configured as or otherwise support a means for receiving a sounding reference signal communicated at a transmission power based on the set of multiple reference signal indices and the set of multiple path loss compensation values.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, more efficient utilization of communication resources, or a combination thereof.

Figure 9:
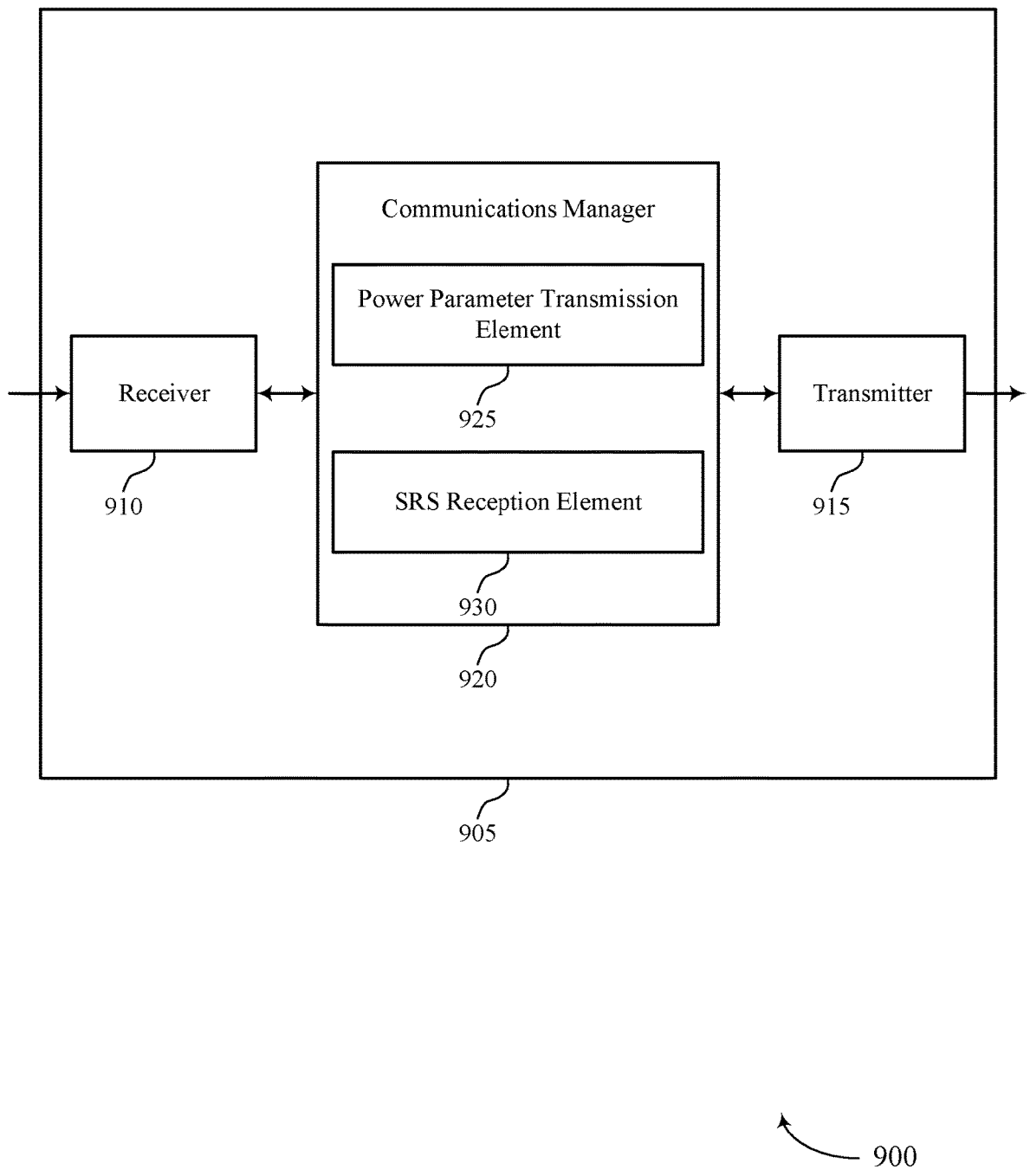

FIG. 9 shows a block diagram 900 of a device 905 that supports power control for sounding reference signals in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of power control for sounding reference signals as described herein. For example, the communications manager 920 may include a power parameter transmission element 925 an SRS reception element 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. The power parameter transmission element 925 may be configured as or otherwise support a means for transmitting an indication of a set of multiple reference signal indices and an indication of a set of multiple path loss compensation values corresponding to the set of multiple reference signal indices. The SRS reception element 930 may be configured as or otherwise support a means for receiving a sounding reference signal communicated at a transmission power based on the set of multiple reference signal indices and the set of multiple path loss compensation values.

Figure 10:
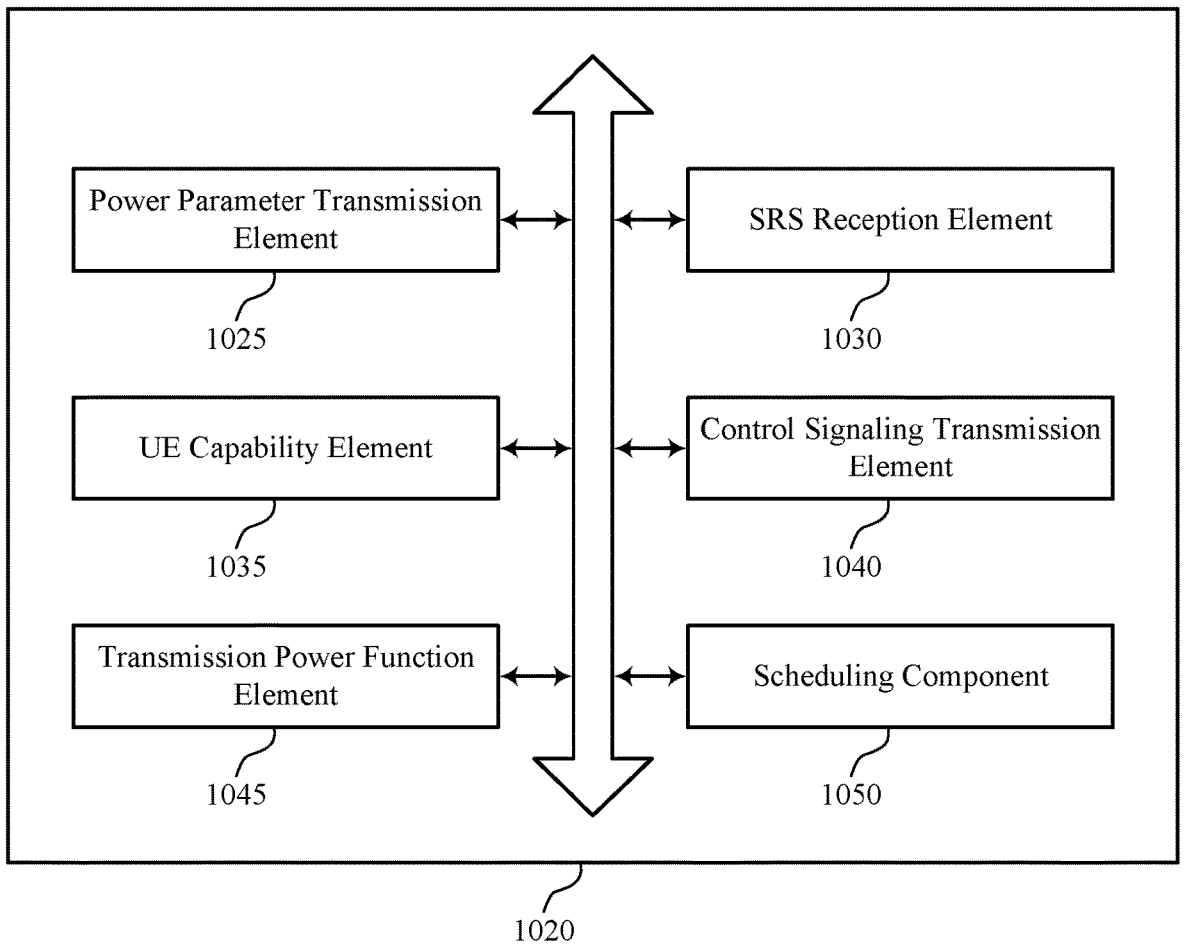
FIG. 10 shows a block diagram of a communications manager that supports power control for sounding reference signals in accordance with one or more aspects of the present disclosure.

FIG. 10 shows a block diagram 1000 of a communications manager 1020 that supports power control for sounding reference signals in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of power control for sounding reference signals as described herein. For example, the communications manager 1020 may include a power parameter transmission element 1025, an SRS reception element 1030, a UE capability element 1035, a control signaling transmission element 1040, a transmission power function element 1045, a scheduling component 1050, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1020 may support wireless communications at a network entity in accordance with examples as disclosed herein. The power parameter transmission element 1025 may be configured as or otherwise support a means for transmitting an indication of a set of multiple reference signal indices and an indication of a set of multiple path loss compensation values corresponding to the set of multiple reference signal indices. The SRS reception element 1030 may be configured as or otherwise support a means for receiving a sounding reference signal communicated at a transmission power based on the set of multiple reference signal indices and the set of multiple path loss compensation values.

In some examples, the UE capability element 1035 may be configured as or otherwise support a means for receiving an indication of UE capability including a quantity of reference signal indices, a quantity of path loss compensation values, or both.

In some examples, the control signaling transmission element 1040 may be configured as or otherwise support a means for transmitting control signaling indicating a function for determining the transmission power to be applied to the set of multiple path loss measurements and the set of multiple path loss compensation values. In some examples, the control signaling transmission element 1040 may be configured as or otherwise support a means for where the transmission power is based on the function.

In some examples, to support transmitting the of the set of multiple reference signal indices and the indication of a set of multiple path loss compensation values, the control signaling transmission element 1040 may be configured as or otherwise support a means for transmitting radio resource control signaling including the indication of the set of multiple reference signal indices and the indication of the set of multiple path loss compensation values.

In some examples, the control signaling transmission element 1040 may be configured as or otherwise support a means for transmitting control signaling indicating a list of reference signal indices corresponding to a sounding reference signal resource set, where the indication of the set of multiple reference signal indices indicates the set of multiple reference signal indices that are a subset of reference signal indices from the list of reference signal indices.

In some examples, the control signaling is radio resource control signaling. In some examples, where a medium access control control element includes the indication of the set of multiple reference signal indices.

In some examples, the transmission power is based on a value pair including a path loss compensation value of the set of multiple path loss compensation values and a path loss measurement of the set of multiple path loss measurements.

In some examples, the value pair is selected based on a time index at which the sounding reference signal is to be transmitted.

In some examples, the transmission power is based on a defined smallest valued pair of pairs of the set of multiple path loss measurements and the set of multiple path loss compensation values.

In some examples, the defined smallest valued pair is selected based on a difference between a value of the defined smallest valued pair and a minimum value of the pairs of the set of multiple path loss measurements and the set of multiple path loss compensation values being less than a threshold value.

In some examples, the transmission power is based on a function that determines an average corresponding to the set of multiple path loss measurements and the set of multiple path loss compensation values.

In some examples, the transmission power is based on a function that determines a maximum value corresponding to the set of multiple path loss measurements and the set of multiple path loss compensation values.

In some examples, the transmission power is based on a function that determines a minimum value corresponding to the set of multiple path loss measurements and the set of multiple path loss compensation values.

Figure 11:
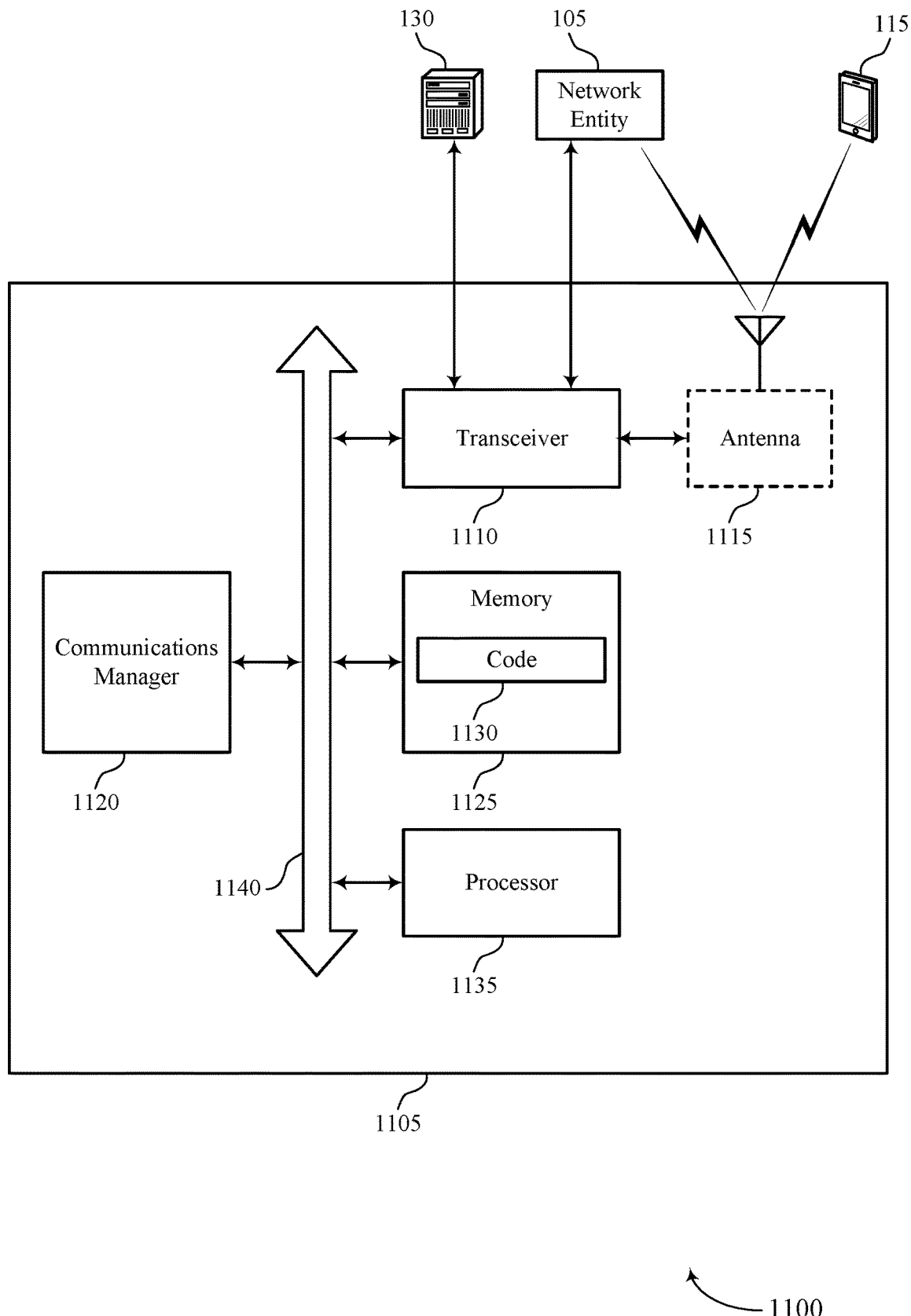
FIG. 11 shows a diagram of a system including a device that supports power control for sounding reference signals in accordance with one or more aspects of the present disclosure.

FIG. 11 shows a diagram of a system 1100 including a device 1105 that supports power control for sounding reference signals in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting power control for sounding reference signals). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

Additionally, or alternatively, the communications manager 1120 may support wireless communications at a network entity in accordance with examples as disclosed herein. For example, the communications manager 1120 may be configured as or otherwise support a means for transmitting an indication of a set of multiple reference signal indices and an indication of a set of multiple path loss compensation values corresponding to the set of multiple reference signal indices. The communications manager 1120 may be configured as or otherwise support a means for receiving a sounding reference signal communicated at a transmission power based on the set of multiple reference signal indices and the set of multiple path loss compensation values.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of power control for sounding reference signals as described herein, or the processor 1135 and the memory 1125 may be otherwise configured to perform or support such operations.

Figure 12:
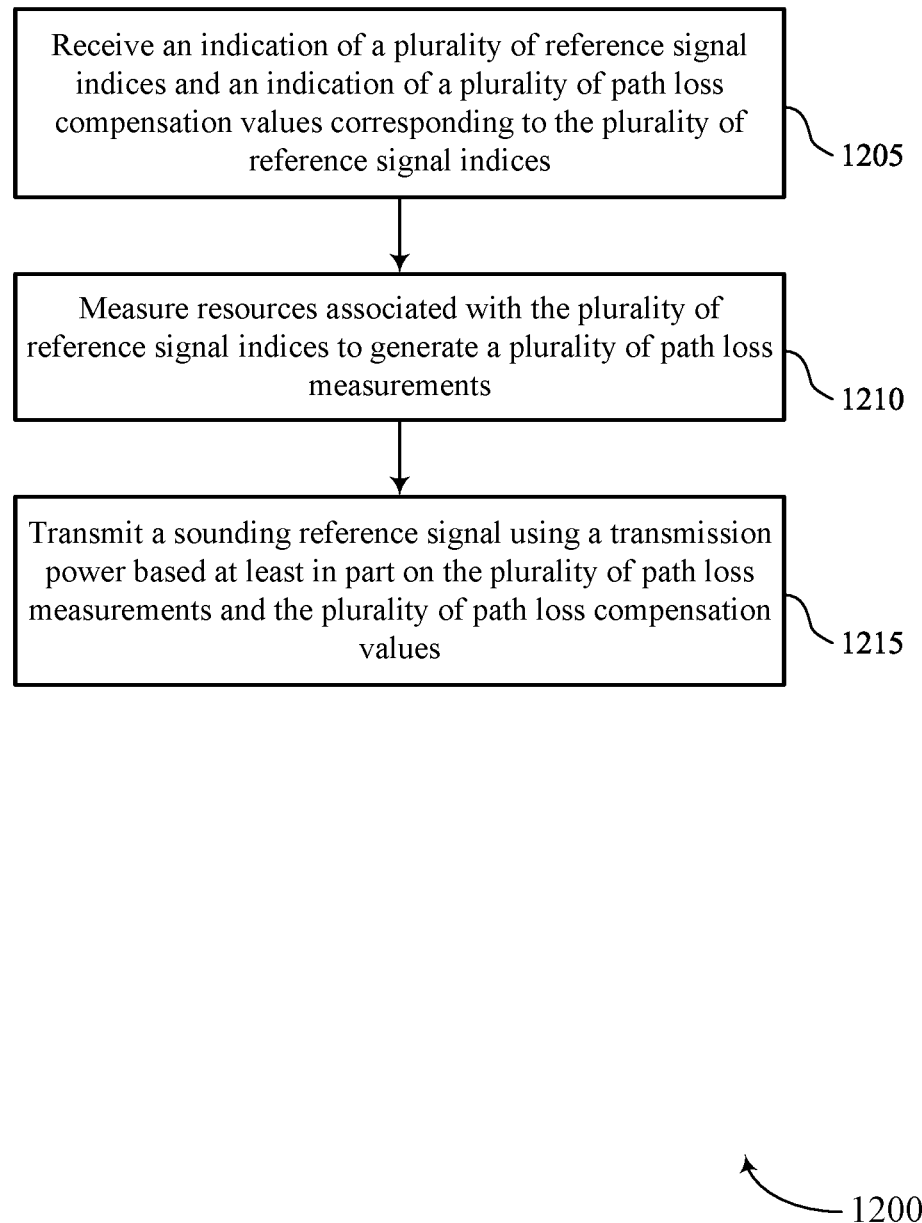
FIG. 12 shows a flowchart illustrating a method implemented by a UE that supports power control for sounding reference signals in accordance with one or more aspects of the present disclosure.

FIG. 12 shows a flowchart illustrating a method 1200 that supports power control for sounding reference signals in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving an indication of a set of multiple reference signal indices and an indication of a set of multiple path loss compensation values corresponding to the set of multiple reference signal indices. The operations of 1205 may be performed in accordance with examples as disclosed herein. In some examples, aspects of the operations of 1205 may be performed by a power parameter reception component 625 as described with reference to FIG. 6.

At 1210, the method may include measuring resources associated with the set of multiple reference signal indices to generate a set of multiple path loss measurements. The operations of 1210 may be performed in accordance with examples as disclosed herein. In some examples, aspects of the operations of 1210 may be performed by a resource measurement component 630 as described with reference to FIG. 6.

At 1215, the method may include transmitting a sounding reference signal using a transmission power based on the set of multiple path loss measurements and the set of multiple path loss compensation values. The operations of 1215 may be performed in accordance with examples as disclosed herein. In some examples, aspects of the operations of 1215 may be performed by an SRS transmission component 635 as described with reference to FIG. 6.

Figure 13:
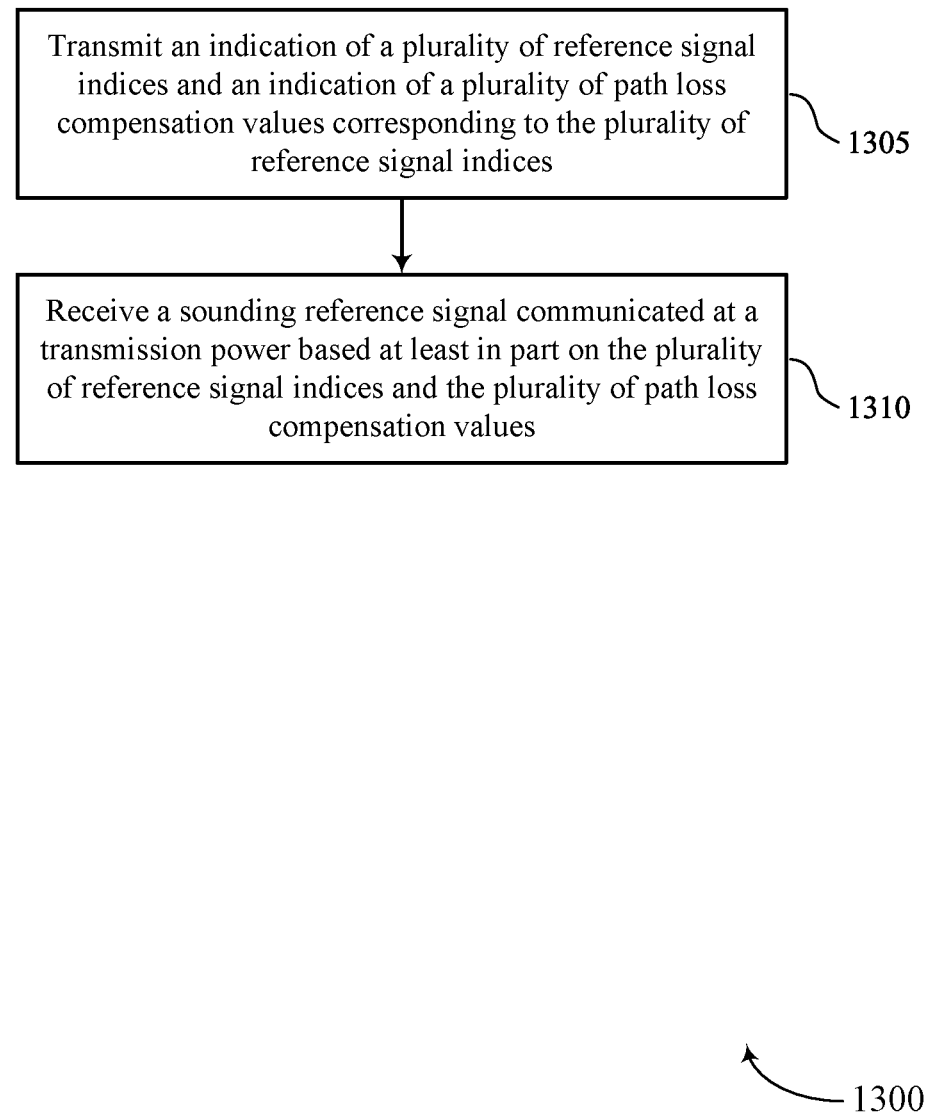
FIG. 13 shows a flowchart illustrating a method implemented by a network entity that supports power control for sounding reference signals in accordance with one or more aspects of the present disclosure.

FIG. 13 shows a flowchart illustrating a method 1300 that supports power control for sounding reference signals in accordance with one or more aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include transmitting an indication of a set of multiple reference signal indices and an indication of a set of multiple path loss compensation values corresponding to the set of multiple reference signal indices. The operations of 1305 may be performed in accordance with examples as disclosed herein. In some examples, aspects of the operations of 1305 may be performed by a power parameter transmission element 1025 as described with reference to FIG. 10.

At 1310, the method may include receiving a sounding reference signal communicated at a transmission power based on the set of multiple reference signal indices and the set of multiple path loss compensation values. The operations of 1310 may be performed in accordance with examples as disclosed herein. In some examples, aspects of the operations of 1310 may be performed by an SRS reception element 1030 as described with reference to FIG. 10.

The following provides an overview of aspects of the present disclosure:

Aspect 1: A method for wireless communications at a UE, comprising: receiving an indication of a plurality of reference signal indices and an indication of a plurality of path loss compensation values corresponding to the plurality of reference signal indices; measuring resources associated with the plurality of reference signal indices to generate a plurality of path loss measurements; and transmitting a sounding reference signal using a transmission power based at least in part on the plurality of path loss measurements and the plurality of path loss compensation values.

Aspect 2: The method of aspect 1, further comprising: transmitting an indication of UE capability comprising a quantity of reference signal indices, a quantity of path loss compensation values, or both.

Aspect 3: The method of any of aspects 1 through 2, further comprising: receiving control signaling indicating a function for determining the transmission power to be applied to the plurality of path loss measurements and the plurality of path loss compensation values; wherein the transmission power is based at least in part on the function.

Aspect 4: The method of any of aspects 1 through 3, wherein receiving the indication of the plurality of reference signal indices and the indication of a plurality of path loss compensation values further comprises: receiving radio resource control signaling comprising the indication of the plurality of reference signal indices and the indication of the plurality of path loss compensation values.

Aspect 5: The method of any of aspects 1 through 4, further comprising: receiving control signaling indicating a list of reference signal indices corresponding to a sounding reference signal resource set, wherein the indication of the plurality of reference signal indices indicates the plurality of reference signal indices that are a subset of reference signal indices from the list of reference signal indices.

Aspect 6: The method of aspect 5, wherein the control signaling is radio resource control signaling; and wherein a medium access control control element comprises the indication of the plurality of reference signal indices.

Aspect 7: The method of any of aspects 1 through 6, wherein the transmission power for the sounding reference signal is based at least in part on a value pair comprising a path loss compensation value of the plurality of path loss compensation values and a path loss measurement of the plurality of path loss measurements.

Aspect 8: The method of aspect 7, wherein the value pair is selected based at least in part on a time index at which the sounding reference signal is to be transmitted.

Aspect 9: The method of any of aspects 1 through 8, wherein the transmission power for the sounding reference signal is based at least in part on a defined smallest valued pair of pairs of the plurality of path loss measurements and the plurality of path loss compensation values.

Aspect 10: The method of aspect 9, wherein the defined smallest valued pair is selected based at least in part on a difference between a value of the defined smallest valued pair and a minimum value of the pairs of the plurality of path loss measurements and the plurality of path loss compensation values being less than a threshold value.

Aspect 11: The method of any of aspects 1 through 10, wherein the transmission power for the sounding reference signal is based at least in part on a function that determines an average corresponding to the plurality of path loss measurements and the plurality of path loss compensation values.

Aspect 12: The method of any of aspects 1 through 11, wherein the transmission power for the sounding reference signal is based at least in part on a function that determines a maximum value corresponding to the plurality of path loss measurements and the plurality of path loss compensation values.

Aspect 13: The method of any of aspects 1 through 12, wherein the transmission power for the sounding reference signal is based at least in part on a function that determines a minimum value corresponding to the plurality of path loss measurements and the plurality of path loss compensation values.

Aspect 14: A method for wireless communications at a network entity, comprising: transmitting an indication of a plurality of reference signal indices and an indication of a plurality of path loss compensation values corresponding to the plurality of reference signal indices; and receiving a sounding reference signal communicated at a transmission power based at least in part on the plurality of reference signal indices and the plurality of path loss compensation values.

Aspect 15: The method of aspect 14, further comprising: receiving an indication of UE capability comprising a quantity of reference signal indices, a quantity of path loss compensation values, or both.

Aspect 16: The method of any of aspects 14 through 15, further comprising: transmitting control signaling indicating a function for determining the transmission power to be applied to the plurality of path loss measurements and the plurality of path loss compensation values; wherein the transmission power is based at least in part on the function.

Aspect 17: The method of any of aspects 14 through 16, wherein transmitting the of the plurality of reference signal indices and the indication of a plurality of path loss compensation values further comprises: transmitting radio resource control signaling comprising the indication of the plurality of reference signal indices and the indication of the plurality of path loss compensation values.

Aspect 18: The method of any of aspects 14 through 17, further comprising: transmitting control signaling indicating a list of reference signal indices corresponding to a sounding reference signal resource set, wherein the indication of the plurality of reference signal indices indicates the plurality of reference signal indices that are a subset of reference signal indices from the list of reference signal indices.

Aspect 19: The method of aspect 18, wherein the control signaling is radio resource control signaling; and wherein a medium access control control element comprises the indication of the plurality of reference signal indices.

Aspect 20: The method of any of aspects 14 through 19, wherein the transmission power is based at least in part on a value pair comprising a path loss compensation value of the plurality of path loss compensation values and a path loss measurement of the plurality of path loss measurements.

Aspect 21: The method of aspect 20, wherein the value pair is selected based at least in part on a time index at which the sounding reference signal is to be transmitted.

Aspect 22: The method of any of aspects 14 through 21, wherein the transmission power is based at least in part on a defined smallest valued pair of pairs of the plurality of path loss measurements and the plurality of path loss compensation values.

Aspect 23: The method of aspect 22, wherein the defined smallest valued pair is selected based at least in part on a difference between a value of the defined smallest valued pair and a minimum value of the pairs of the plurality of path loss measurements and the plurality of path loss compensation values being less than a threshold value.

Aspect 24: The method of any of aspects 14 through 23, wherein the transmission power is based at least in part on a function that determines an average corresponding to the plurality of path loss measurements and the plurality of path loss compensation values.

Aspect 25: The method of any of aspects 14 through 24, wherein the transmission power is based at least in part on a function that determines a maximum value corresponding to the plurality of path loss measurements and the plurality of path loss compensation values.

Aspect 26: The method of any of aspects 14 through 25, wherein the transmission power is based at least in part on a function that determines a minimum value corresponding to the plurality of path loss measurements and the plurality of path loss compensation values.

Aspect 27: An apparatus for wireless communications at a UE, comprising a processor; memory coupled with the processor; and instructions stored in the memory and executable by the processor to cause the apparatus to perform a method of any of aspects 1 through 13.

Aspect 28: An apparatus for wireless communications at a UE, comprising at least one means for performing a method of any of aspects 1 through 13.

Aspect 29: A non-transitory computer-readable medium storing code for wireless communications at a UE, the code comprising instructions executable by a processor to perform a method of any of aspects 1 through 13.

Aspect 30: An apparatus for wireless communications at a network entity, comprising a processor; memory coupled with the processor; and instructions stored in the memory and executable by the processor to cause the apparatus to perform a method of any of aspects 14 through 26.

Aspect 31: An apparatus for wireless communications at a network entity, comprising at least one means for performing a method of any of aspects 14 through 26.

Aspect 32: A non-transitory computer-readable medium storing code for wireless communications at a network entity, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   memory coupled with the one or more processors; and
   instructions stored in the memory and executable by the one or more processors to cause the apparatus to:
      transmit an indication of a UE capability that identifies a first quantity of reference signal indices supported by the UE for power control operations and a quantity of path loss compensation values;
      receive, based at least in part on the indication of the UE capability, an indication of a plurality of reference signal indices and an indication of a plurality of path loss compensation values corresponding to the plurality of reference signal indices;
      measure resources associated with the plurality of reference signal indices to generate a plurality of path loss measurements; and
      transmit a sounding reference signal using a transmission power based at least in part on the plurality of path loss measurements and the plurality of path loss compensation values.

2. The apparatus of claim 1, wherein the first quantity of reference signal indices is different than a second quantity of reference signals of which the UE is capable of tracking.

3. The apparatus of claim 1, wherein the instructions are further executable by the one or more processors to cause the apparatus to:
   receive control signaling indicating a function for determining the transmission power to be applied to the plurality of path loss measurements and the plurality of path loss compensation values;
   wherein the transmission power is based at least in part on the function.

4. The apparatus of claim 1, wherein the instructions to receive the indication of the plurality of reference signal indices and the indication of the plurality of path loss compensation values are further executable by the one or more processors to cause the apparatus to:
   receive radio resource control signaling comprising the indication of the plurality of reference signal indices and the indication of the plurality of path loss compensation values.

5. The apparatus of claim 1, wherein the instructions are further executable by the one or more processors to cause the apparatus to:
   receive control signaling indicating a list of reference signal indices corresponding to a sounding reference signal resource set, wherein the indication of the plurality of reference signal indices indicates the plurality of reference signal indices that are a subset of reference signal indices from the list of reference signal indices.

6. The apparatus of claim 5, wherein:
   the control signaling is radio resource control signaling; and
   a medium access control control element comprises the indication of the plurality of reference signal indices.

7. The apparatus of claim 1, wherein the transmission power for the sounding reference signal is based at least in part on a value pair comprising a path loss compensation value of the plurality of path loss compensation values and a path loss measurement of the plurality of path loss measurements.

8. The apparatus of claim 7, wherein the value pair is selected based at least in part on a time index at which the sounding reference signal is to be transmitted.

9. The apparatus of claim 1, wherein the transmission power for the sounding reference signal is based at least in part on a defined smallest valued pair of pairs of the plurality of path loss measurements and the plurality of path loss compensation values.

10. The apparatus of claim 9, wherein the defined smallest valued pair is selected based at least in part on a difference between a value of the defined smallest valued pair and a minimum value of the pairs of the plurality of path loss measurements and the plurality of path loss compensation values being less than a threshold value.

11. The apparatus of claim 1, wherein the transmission power for the sounding reference signal is based at least in part on a function that determines an average corresponding to the plurality of path loss measurements and the plurality of path loss compensation values.

12. The apparatus of claim 1, wherein the transmission power for the sounding reference signal is based at least in part on a function that determines a maximum value corresponding to the plurality of path loss measurements and the plurality of path loss compensation values.

13. The apparatus of claim 1, wherein the transmission power for the sounding reference signal is based at least in part on a function that determines a minimum value corresponding to the plurality of path loss measurements and the plurality of path loss compensation values.

14. An apparatus for wireless communications at a network entity, comprising:
one or more processors;
memory coupled with the one or more processors; and
instructions stored in the memory and executable by the one or more processors to cause the apparatus to:
receive an indication of a user equipment (UE) capability of a UE that identifies a first quantity of reference signal indices supported by the UE for power control operations and a quantity of path loss compensation values;
transmit, based at least in part on the indication of the UE capability, an indication of a plurality of reference signal indices and an indication of a plurality of path loss compensation values corresponding to the plurality of reference signal indices; and
receive a sounding reference signal communicated at a transmission power based at least in part on the plurality of reference signal indices and the plurality of path loss compensation values.

15. The apparatus of claim 14, wherein the first quantity of reference signal indices is different than a second quantity of reference signals of which the UE is capable of tracking.

16. The apparatus of claim 14, wherein the instructions are further executable by the one or more processors to cause the apparatus to:
transmit control signaling indicating a function for determining the transmission power to be applied to a plurality of path loss measurements and the plurality of path loss compensation values;
wherein the transmission power is based at least in part on the function.

17. The apparatus of claim 14, wherein the instructions to transmit the indication of the plurality of reference signal indices and the indication of the plurality of path loss compensation values are further executable by the one or more processors to cause the apparatus to:
transmit radio resource control signaling comprising the indication of the plurality of reference signal indices and the indication of the plurality of path loss compensation values.

18. The apparatus of claim 14, wherein the instructions are further executable by the one or more processors to cause the apparatus to:
transmit control signaling indicating a list of reference signal indices corresponding to a sounding reference signal resource set, wherein the indication of the plurality of reference signal indices indicates the plurality of reference signal indices that are a subset of reference signal indices from the list of reference signal indices.

19. The apparatus of claim 18, wherein:
the control signaling is radio resource control signaling; and
a medium access control control element comprises the indication of the plurality of reference signal indices.

20. The apparatus of claim 14, wherein the transmission power is based at least in part on a value pair comprising a path loss compensation value of the plurality of path loss compensation values and a path loss measurement of a plurality of path loss measurements.

21. The apparatus of claim 20, wherein the value pair is selected based at least in part on a time index at which the sounding reference signal is to be transmitted.

22. The apparatus of claim 14, wherein the transmission power is based at least in part on a defined smallest valued pair of pairs of a plurality of path loss measurements and the plurality of path loss compensation values.

23. The apparatus of claim 22, wherein the defined smallest valued pair is selected based at least in part on a difference between a value of the defined smallest valued pair and a minimum value of the pairs of the plurality of path loss measurements and the plurality of path loss compensation values being less than a threshold value.

24. The apparatus of claim 14, wherein the transmission power is based at least in part on a function that determines an average corresponding to a plurality of path loss measurements and the plurality of path loss compensation values.

25. The apparatus of claim 14, wherein the transmission power is based at least in part on a function that determines a maximum value corresponding to a plurality of path loss measurements and the plurality of path loss compensation values.

26. The apparatus of claim 14, wherein the transmission power is based at least in part on a function that determines a minimum value corresponding to a plurality of path loss measurements and the plurality of path loss compensation values.

27. A method for wireless communications at a user equipment (UE), comprising:
transmitting an indication of a UE capability that identifies a first quantity of reference signal indices supported by the UE for power control operations and a quantity of path loss compensation values;
receiving, based at least in part on the indication of the UE capability, an indication of a plurality of reference signal indices and an indication of a plurality of path loss compensation values corresponding to the plurality of reference signal indices;
measuring resources associated with the plurality of reference signal indices to generate a plurality of path loss measurements; and
transmitting a sounding reference signal using a transmission power based at least in part on the plurality of path loss measurements and the plurality of path loss compensation values.

28. The method of claim 27, wherein the first quantity of reference signal indices is different than a second quantity of reference signals of which the UE is capable of tracking.

29. A method for wireless communications at a network entity, comprising:
receiving an indication of a user equipment (UE) capability of a UE that identifies a first quantity of reference signal indices supported by the UE for power control operations and a quantity of path loss compensation values;
transmitting, based at least in part on the indication of the UE capability, an indication of a plurality of reference signal indices and an indication of a plurality of path loss compensation values corresponding to the plurality of reference signal indices; and
receiving a sounding reference signal communicated at a transmission power based at least in part on the plurality of reference signal indices and the plurality of path loss compensation values.

30. The method of claim 29, further comprising:
transmitting control signaling indicating a function for determining the transmission power to be applied to a plurality of path loss measurements and the plurality of path loss compensation values;
wherein the transmission power is based at least in part on the function.

\* \* \* \* \*